US005864684A

United States Patent [19]
Nielsen

[11] Patent Number: 5,864,684
[45] Date of Patent: Jan. 26, 1999

[54] METHOD AND APPARATUS FOR MANAGING SUBSCRIPTIONS TO DISTRIBUTION LISTS

[75] Inventor: Jakob Nielsen, Atherton, Calif.

[73] Assignee: Sun Microsystems, Inc., Palo Alto, Calif.

[21] Appl. No.: 651,372

[22] Filed: May 22, 1996

[51] Int. Cl.$^6$ .............................. G06F 13/38; G06F 15/17
[52] U.S. Cl. ................................... 395/200.36; 395/200.7
[58] Field of Search ................................. 395/200.36, 50, 395/60, 200.68, 200.7; 379/67, 89

[56] References Cited

U.S. PATENT DOCUMENTS

| | | | |
|---|---|---|---|
| 5,283,856 | 2/1994 | Gross et al. | 395/51 |
| 5,377,354 | 12/1994 | Scannell et al. | 395/650 |
| 5,428,784 | 6/1995 | Cahill, Jr. | 395/650 |
| 5,551,030 | 8/1996 | Linden et al. | 395/600 |
| 5,572,578 | 11/1996 | Lin et al. | 379/89 |

OTHER PUBLICATIONS

Microsoft Press, Computer Dictionary, 1994
CE Software, "Quickmail, Your Complete Messaging Solution", 1994.

"Standard for the Format of ARPA Internet Text Messages", revised by David H. Crocker, Dept. of Electrical Engineering, University of Delaware, Newark, DE 19711, RFC #822, Aug. 13, 1982 pp. i–28.

"Listserv User Guide Earn Associateion", Listserv Guide for General Users, Jul. 29, 1993, pp. 1–43.

Chapter about Majordomo from the Netshell Handbook "Managing Internet Information Services", by Jerry Peck, current as of Mar. 15, 1994, 17 pages.

*Primary Examiner*—Mark H. Rinehart
*Attorney, Agent, or Firm*—McDermott, Will & Emery

[57] ABSTRACT

Apparatus, methods, systems and computer program products are disclosed to simplify a computer user's handling of distribution lists for electronic mail messages. The invention provides the computer user with a mechanism for managing e-mail distribution lists. The mechanism includes facilities for suspending e-mail messages from a distribution list for a specified duration.

30 Claims, 19 Drawing Sheets

```
Date: Mon, 15 Apr 1996 16:17:27 -0700
To: Majordomo@GreatCircle.COM
From: bperson@sun.com
Subject: SUSPEND List-Managers 15 aperson@sun.com
```

FIGURE 2a

```
Date: Mon, 15 Apr 1996 16:17:27 -0700
To: Majordomo@GreatCircle.COM
From: aperson@sun.com
Subject: a suspend message SUSPEND List-Managers 15 aperson@sun.com
```

FIGURE 2b

METHOD AND APPARATUS FOR MANAGING SUBSCRIPTIONS TO DISTRIBUTION LISTS

BACKGROUND OF THE INVENTION

1. Field of the Invention

This invention relates to the field of Electronic Mail Management Systems. Specifically, this invention is a new and useful method, apparatus and computer program product for managing electronic mail (e-mail) messages forwarded from distribution lists (distribution lists are often termed mailing lists).

2. Background

Electronic mail provides a quick and convenient way for computer users to communicate. This communication is initiated by a message sender who composes the message using a text editing program, provides the e-mail address of the intended recipient, and often provides an indication of the content (subject matter) of the message by providing text in a "subject" field. Using well-understood technology this composed message is then sent to the recipient's computer address. The recipient's computer receives the message and stores it in the recipient's inbox. The recipient eventually reads, deletes, responds to, or otherwise processes the message stored within the inbox by using any of a number of e-mail programs well known in the art.

Because these messages travel across networks, they generally are constructed according to the *Standard for the Format of ARPA Internet Text Messages* specification (RFC822). This specification can be found on the world wide web of the Internet at address "http://www.cis.ohio-state.edu/htbin/rfc/rfc822.html". Messages formatted to the RFC822 standard have a header portion and an optional body portion that contains the text of the message. The header portion includes a number of fields that address and classify the message. Although the embodiment described herein uses the RFC822 protocol, the invention does not require the RFC822 standard.

The header portion of a message contains fields composed of character strings comprising a field-name followed by a colon, followed by a field-body terminated by a carriage return/line feed. An example header field is:

"To: John Doe<CR><LF>".

In this example, the <CR> represents the ASCII carriage return character and the <LF> represents the ASCII line feed character. The header field-names are not case sensitive, thus, "to:" is equivalent to "TO:", "To:" or "tO:".

The contents of these headers are specified by the entity who composes the message.

The "To:" field-body contains the addresses of the primary recipients of the message where the address of each recipient is separated by a comma. Recipients include both humans and programs. The "Subject:" field-body often provides a summary, or indicates the nature, of the message and sometimes contains a specialized command string that is to be recognized by the recipient. Although these fields are all initialized by the sender, the recipient fields are generally limited to actual Internet addresses. On the other hand, the subject field has no specific meaning and may, in fact, be blank, contain a specialized command string or contain a random arrangement of characters.

A sender can address a single message to many recipients by separating the addresses of the recipients with a comma. Each of these recipients may respond to the original message by sending a reply message to the same list of recipients (plus the original sender). Some of these recipients may then respond to the first reply message. These reply messages are termed follow-up messages to the original message. This process facilitates a vigorous discussion between the original sender and the recipients, as well as between the recipients.

An example of application programs that are recipients of electronic mail are list server (listserver) applications. A listserver application (when executing on an appropriate computer) receives mail addressed to the e-mail address of the distribution list (mailing list) serviced by the listserver, and forwards (redistributes) that received mail to the subscribers of the distribution list. A distribution list is generally directed towards a particular subject matter (e.g., the copyright list "cni-copyright@cni.org"). The listserver application also services commands contained in messages sent directly to the e-mail address of the listserver application (as compared to messages sent to the e-mail address of the distribution list served by the listserver application). Listserver applications generally recognize "subscribe" and "unsubscribe" command messages. Those interested in the subject matter of the distribution list send a "subscribe" command message to the listserver controlling the distribution list. The listserver maintains a recipient database that comprises the e-mail address of each recipient. The listserver forwards every e-mail message sent to the e-mail address of the distribution list to the e-mail address of every recipient in the recipient database. A recipient sends an "unsubscribe" command message to the listserver to remove the recipient's e-mail address from the recipient database and thus stop the listserver from forwarding, to the recipient, messages addressed to the distribution list.

Distribution lists can be managed directly by some human agency, a listserver application, or a combination of both. Some distribution lists are moderated in the sense that a human reviews all incoming messages prior to forwarding them to the distribution list subscribers. Other distribution lists are not moderated. Thus, messages received by the unmoderated group are automatically forwarded to the rest of the subscribers without human review.

The "majordomo" and "listserv" applications are two of the more popular listserver applications. The listserv application is described in the *LISTSERV User Guide*, 1993, ISBN 2-910286-02-9, ©1993 by EARN Association. This document is available on the Internet at "ftp://ftp.msstate.edu/docs/words-l/Net-Stuff/listserv.guide". The majordomo application is described in a chapter of *Managing Internet Information Services*, by Jerry Peek, ©1994 by O'Reilly & Associates, Inc., ISBN 1-56592-062-7.

One of the problems with the use of distribution lists is that they generate a large number of e-mail messages. Unless these messages are read on a daily basis, they accumulate in the recipient's inbox resulting in a backlog of e-mail messages. The time required to read and evaluate this backlog often becomes an annoyance for busy people. Another problem is that e-mail messages from a distribution list are generally sent to the recipient's primary e-mail address. Thus, the backlog of distribution list messages are intermixed with the recipient's normal business and personal mail thereby obscuring e-mail that may be of more immediate relevance to the recipient than e-mail forwarded from the distribution list.

An example of when a recipient's e-mail becomes backlogged is when the recipient is traveling and does not have access, or time, to process e-mail messages. Another cause of e-mail backlog is when the recipient is under a deadline or some other circumstance where the recipient does not have time to deal with the distractions of considering non-critical e-mail. In both these examples, the recipient could unsubscribe from the distribution list during the duration of the event causing the e-mail backlog and then subscribe again after the event ends. However, often (especially in the above circumstances) the recipient will forget the name of the unsubscribed list and will be required to spend an inordinate amount of time to gather the information required to resubscribe to the distribution list.

Another approach to this problem is partially addressed in the prior art by creating recipient modifiable "filters" that ignore e-mail messages forwarded from a distribution list. These filters examine each e-mail message for some condition. If the filter detects that condition in the e-mail message, the filter performs an operation on that e-mail message. These filter operations generally include a delete operation. Thus, e-mail messages forwarded from a particular list can be deleted without intervention by the recipient. However, e-mail messages that have already been stored in the recipient's inbox are generally not accessible to a filter. Thus, the recipient's unread e-mail messages stored in the recipient's inbox will not be removed by most filters. Further, even those filters that can remove e-mail messages from the recipient's inbox require the recipient to execute some additional command to do so. Also, filters are notoriously difficult for non-programmers to use and often require significant debugging. Finally, at some later date the recipient must remember to deactivate the filter to, once again, receive e-mail messages forwarded from the distribution list.

Another problem associated with distribution lists is that recipient often forgets which listserver manages each of the distribution lists subscribed to by the recipient. Many busy people will forget the lists they subscribed to, which listserver supports each list, and how to subscribe to, and unsubscribe from, each list.

For these reasons, among others, recipients of e-mail from distribution lists need a tool to manage their subscribed distribution lists. The invention addresses these problems and simplifies a recipient's use of distribution lists by providing mechanisms for keeping track of distribution lists and for suspending, for a specified duration, e-mail forwarded from distribution lists.

SUMMARY OF THE INVENTION

The present invention overcomes the disadvantages of the above described systems and provides an economical, apparatus, method, system and computer program product for providing enhanced facilities to recipients of electronic mail forwarded from distribution lists. One aspect of the invention teaches a computer controlled method for distributing e-mail list messages to a recipient of a distribution list. List messages are e-mail messages sent to the e-mail address of the distribution list. The distribution list is managed by a listserver that actually distributes the list messages to the recipient. This method comprises the steps of selecting a distribution list, specifying a duration and causing the listserver to suspend distribution of the list messages to the recipient for the specified duration.

Another aspect of the invention discloses a listserver apparatus having a CPU, a memory and a filestorage mechanism configured to distribute to a recipient those list messages sent to a distribution list. The listserver apparatus includes a suspend mechanism that stops distribution of the list messages to the recipient in response to a suspend command. The listserver apparatus also includes a storage mechanism that stores resumption information derived from the suspend command. This resumption information includes a duration for the suspension. Finally, the listserver apparatus includes a resumption mechanism that automatically resumes distribution of list messages to the recipient after the duration of the suspension.

Another listserver aspect of the invention, discloses a computer program product having computer readable code, embodied on a computer usable storage medium, for causing a computer to distribute list messages to a recipient. This computer program product includes a suspend mechanism that suspends distribution of list messages after receiving a suspend command. A storage mechanism stores resumption information, including a duration for the suspension, derived from the suspend command. A resumption mechanism automatically resumes, by accessing the stored resumption information, distribution of list messages to the recipient after the duration.

Yet another aspect of the invention discloses a list management apparatus having a CPU, memory and filestorage mechanism. This list management apparatus sends e-mail command messages to the listserver that serves the distribution list. This list management apparatus stores list information, including resumption information, by using a database mechanism. The apparatus also includes a list suspension mechanism that causes the listserver to suspend distribution of list messages for a duration.

Another list management aspect of the invention, discloses a computer program product having computer readable code, embodied on a computer usable storage medium, for causing a computer to manage a distribution list controlled by a listserver. The computer program product including a database mechanism for storing information about the distribution lists managed by the listserver. The computer program product also containing a list suspension mechanism to cause the listserver to suspend distribution of list messages to the recipient for a duration. This list suspension mechanism operates by sending command messages to the listserver.

Another aspect of the invention discloses a list management apparatus having a CPU, memory, and filestorage configured to manage a listserver controlled distribution list. The list management apparatus sends command messages to the listserver in response to user commands. The apparatus also includes a list subscription mechanism to subscribe to a distribution list in response to a user command.

Another list management apparatus aspect of the invention is a computer program product for managing a distribution list by sending command messages to a listserver in response to user commands. The program product including a subscription mechanism that sends a subscribe command message to the listserver in response to a user add command.

A final aspect of the invention is a list management system having a listserver application and a distribution list management application. The system includes a database to store information about distribution lists. Additionally the system includes a database manipulation mechanism that allows a user to manipulate this database and a listserver command mechanism. The listserver command mechanism is responsive to the database manipulation mechanism in that the database manipulation mechanism causes command messages to be sent to the listserver where the listserver performs an operation based on the command message.

DESCRIPTION OF THE DRAWINGS

The objects, features and advantages of the system of the present invention will be apparent from the following description in which:

FIGS. 2A–2B illustrate sample e-mail messages containing the SUSPEND listserver command in accordance with preferred embodiments;

NOTATIONS AND NOMENCLATURE

Dialog

Figure 1A:
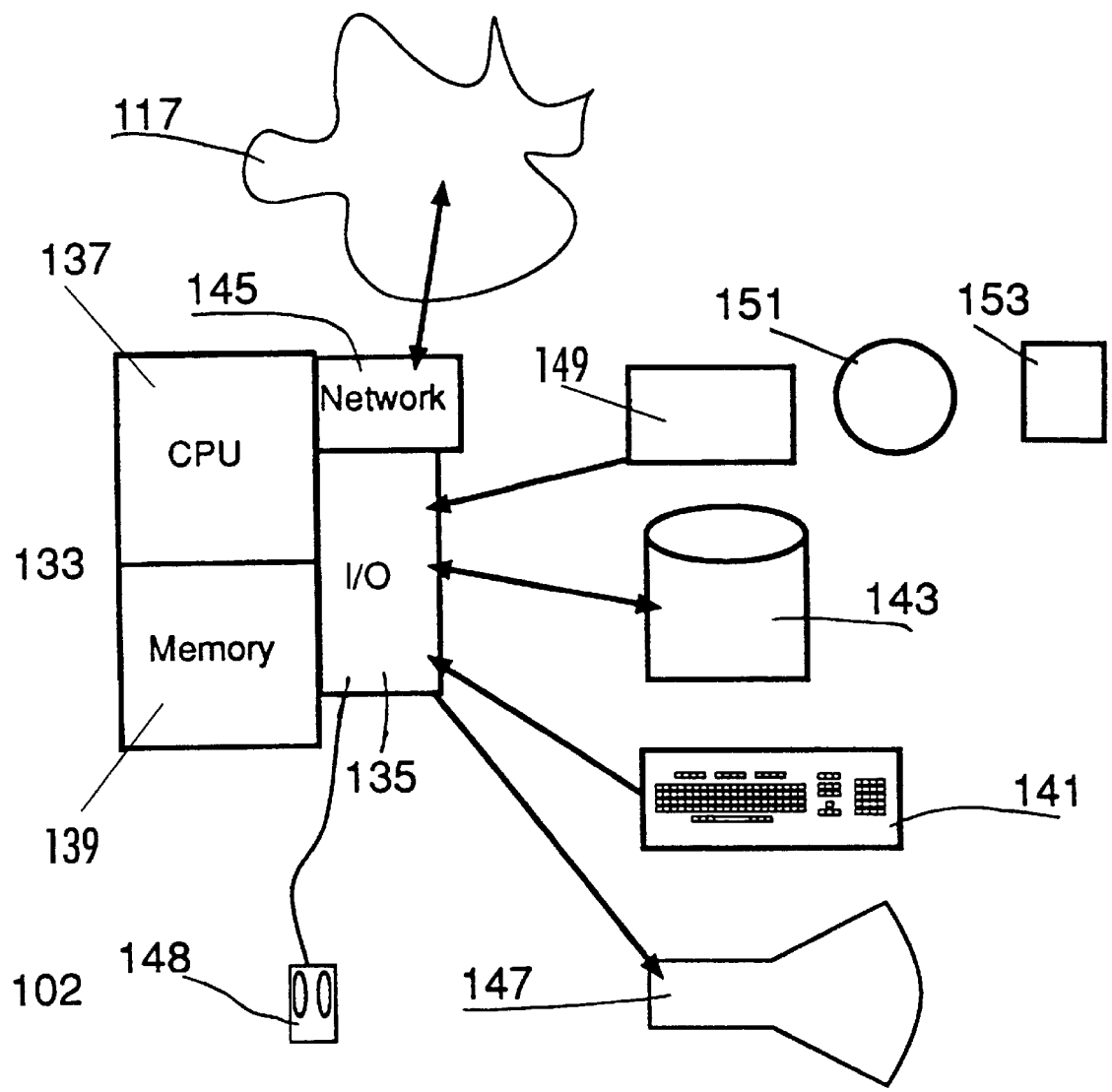
FIG. 1A illustrates a portion of a computer, including a CPU and a conventional memory in which the present invention may be embodied.

A specialized window that is used to obtain additional information from the user. A dialog is often used to obtain options and parameters that are computer dependent. A good example is a print dialog that is evoked by a print menu command. The print dialog allows the user to specify what printer options are to be used for a particular print job. Generally the dialog allows the user to specify specific parameters and then to either affirm or cancel the command that evoked the dialog. If the user cancels the command, the dialog window is removed and the command that evoked the dialog is aborted. If the user confirms the command the user provided information acquired by the dialog is used in the execution of the command that evoked the dialog.

Database

The specification refers to three databases: the recipient database, the subscribed database and the suspended database. These databases are described in this section under each name.

Distribution List

An e-mail recipient that receives e-mail and forwards that e-mail to subscribers to the distribution list. A distribution list is often managed by a computer application called a listserver. A distribution list is often termed a mailing list.

E-mail System

Electronic mail system. A system of computers generally connected by a network that allow a sender (being a user of a first computer) to compose and send data making up a message to a recipient (being a user of either the first computer or of a second computer).

Forwardation

The process of forwarding e-mail addressed to a distribution list to subscribers of the distribution list. The listserver controlling the distribution list performs this process.

Graphical User Interface (GUI)

A user interface that allows a user to interact with a computer display by pointing at selectable control areas on the display and activating a command or computer operation associated with the selectable control area. GUIs are well known in the art.

List Management Application a programmed application executing on a computer that maintains a database of information about one or more distribution lists. This application provides a computer user with an integrated tool to manage adding and removing distribution lists; for suspending e-mail from distribution lists; and for modifying the database.

Listserver

An automated mailing list management application program that, in response to e-mail messages addressed to the listserver, causes a computer to maintain a recipient database of recipients who will receive copies of e-mail messages sent to the distribution list serviced by the listserver. The listserver generally provides mechanisms for subscribing and unsubscribing recipients to the list.

Mailing List see distribution list.

Message an electronic mail transmission that contains structured addressing information in a header portion, and free form data (generally textual data) in a body portion of an electronic communication. Messages have similar capabilities as those defined by RFC822.

Pointing Device

A device that is responsive to a computer user's input that moves an indicator on a computer display screen. Such an indicator has an active point such that if the pointing device is activated (e.g., by a button push for a mouse device) a command associated with the selectable control area covered by the active point is evoked. Pointing devices are generally used with GUIs.

Radio Button is a group of interrelated selectable control areas on a GUI each having a ON/OFF state. Only one selectable control area of the group can be selected at any given time.

Recipient is an addressable entity, such as a human or a programmed application executing on a computer, that receives an addressed e-mail message.

Recipient Database

The database maintained by a listserver that comprises the e-mail addresses of the subscribers to distribution lists serviced by the listserver.

Selectable Control Area

An area on a computer display that is sensitive to activation of a pointing device. On activation of the pointing device over the selectable control area, a command or computer operation associated with the selectable control area is evoked. Most computer systems that provide a GUI also provide other methods for evoking these commands or computer operations such as keyboard function keys or command lines.

Subscribed Database

The database maintained by a list management application that comprises information relating to the management of distribution lists.

Suspended Database

The database maintained by a listserver, practicing the invention, that contains information about recipients who have suspended listserver forwardation.

Window an area, usually rectangular, on a computer display screen controlled by an application.

A procedure is a self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols characters, terms, numbers, or the like. It will be understood by those skilled in the art that all of these and similar terms are associated with the appropriate physical quantities and are merely convenient labels applied to these quantities.

The manipulations performed by a computer in executing opcodes are often referred to in terms, such as adding or comparing, that are commonly associated with mental operations performed by a human operator. No such capability of a human operator is necessary in any of the operations described herein that form part of the present invention; the operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

Finally, the invention may be embodied in a computer readable medium encoded with a listserver application, a list management application or both.

DESCRIPTION OF THE PREFERRED EMBODIMENTS

Operating Environment

Some of the elements of a computer system 102 configured to support an e-mail application is shown in FIG. 1A wherein a processor 133 is shown, having an Input/Output ("I/O") section 135, a central processing unit ("CPU") 137 and a memory section 139. The I/O section 135 is connected to a keyboard 141, a disk storage unit 143, a network interface 145 to provide access to a network 117, a display unit 147, a pointing device 148 and a CD-ROM drive unit 149. The CD-ROM unit 149 can read a CD-ROM medium 151 that typically contains programs 153 and data. The CD-ROM 149 and the disk storage unit 143 contributing to a filestorage mechanism. Such a computer system is capable of executing e-mail applications that embody the invention. One skilled in the art will understand that the filestorage mechanism may comprise read only memory, RAM or other storage technology that allows a computer to access data.

Figure 1B:
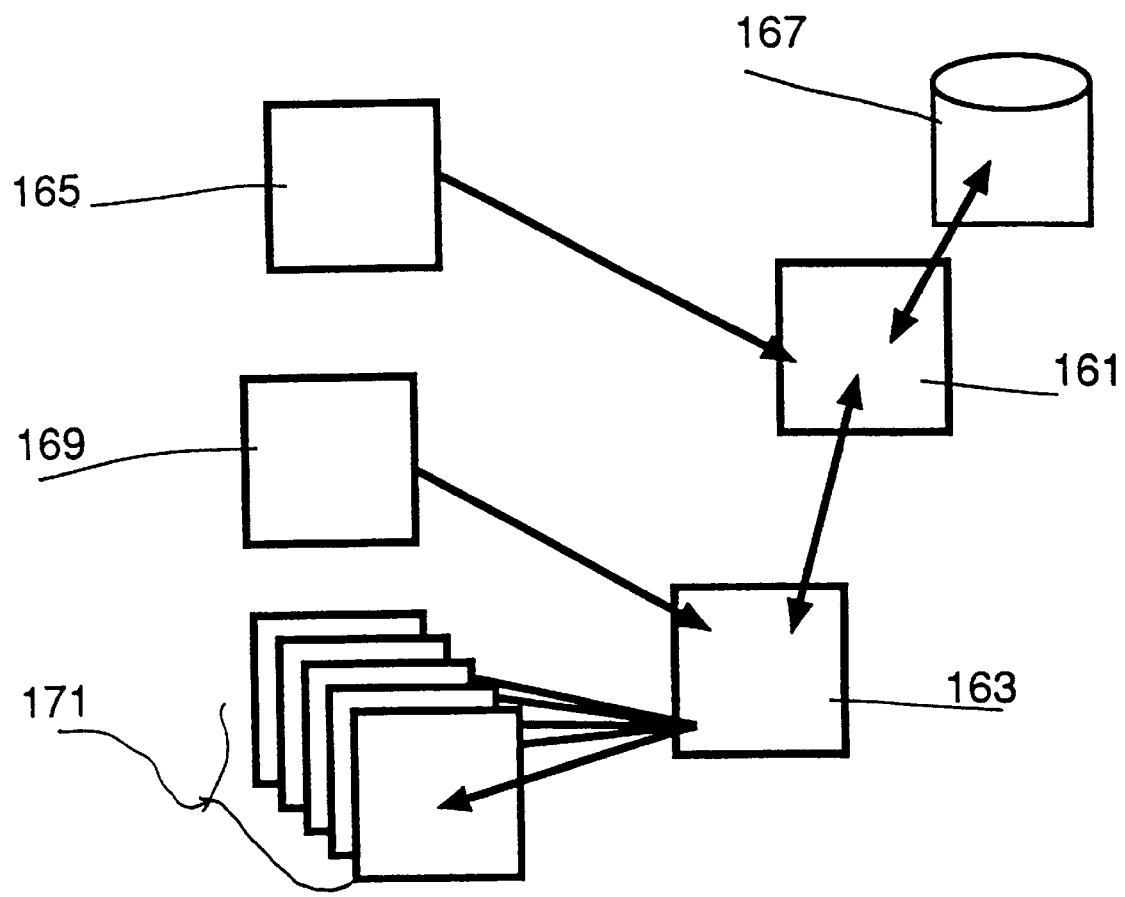
FIG. 1B illustrates the operation of a listserver application in the prior art.

FIG. 1B illustrates listserver concepts. A listserver application 161 manages distribution of an electronic mail (e-mail) list message 169 sent to a distribution list (mailing list) 163 for forwarding copies 171 of the list message 169 to multiple recipients who have subscribed to the distribution list. The listserver application 161 maintains a recipient database, using a filestorage 167, containing information about subscribers to the distribution list 163. A user who desires to send a command to the listserver application 161 sends the command within an e-mail message 165 addressed to the listserver 161. On receipt of the e-mail message, the listserver processes the command to perform an operation. Common commands that can be sent to a listserver include subscribe, and unsubscribe commands. Depending on the listserver, these commands are included in the header portion and/or body portion of the message. The distribution list controlled by a listserver has a different e-mail address from the e-mail address of the controlling listserver.

Suspend Message

FIGS. 2A and 2B illustrate the content of messages that contain a SUSPEND command used in a preferred embodiment of the invention. The SUSPEND command is used to cause a listserver to suspend, for a specified duration, forwardation, to a specified recipient, of messages sent to a distribution list. In a preferred embodiment the SUSPEND command consists of a textual string within an e-mail message.

FIG. 2A illustrates one form of an e-mail message 201 containing a SUSPEND command. This form does not utilize any information in the message body portion. Instead, the Subject: header field 215 contains a particular SUSPEND command string 207. This command string 207 is further described below. In a preferred embodiment, the date and time the message was sent is specified by the Date: header 203. However, the invention does not require the Date: header 203. If the Date: header 203 is not included in the message 201, the date and time when the message is actually received by the listserver is used. The To: header 205 contains the address of the listserver for the distribution list being suspended. The From: header 209 contains the e-mail address of the entity sending the message 201 (the originator).

The SUSPEND command 207 has the following format:
SUSPEND listid num-days subscriber-address
where:
  num-days is a text string (the duration string) specifying the number of days to suspend distribution of messages sent to the distribution list;
  subscriber-address is a text string (the subscriber address string) specifying the e-mail address of the recipient of messages forwarded from the distribution list; and
  listid is a text string (the list name string) specifying the name of the distribution list being suspended.
Thus the affect of the SUSPEND command 207 contained in the message 201 is to suspend distribution of messages from the "List-managers" distribution list to "aperson@sun.com" for a duration of "15" days. Those skilled in the art will understand that the num-days field is but one way of specifying a duration for the suspension of the distribution list. Other methods to specify duration include, without limitation, specifying an ending date, a calendar period, or a termination date triggered off of some other occurrence or event.

FIG. 2B illustrates another form of the message 251 containing a SUSPEND command. This form places the SUSPEND command 257 within the body portion of the message 252. Like the message 201 of FIG. 2A, the message header includes a Date: field 253, a To: field 255, a From: field 259, and possibly a Subject: field 265. The Date: 253, To: 255, and From: 259 fields have the same meaning as described above for FIG. 2A. The Subject: field may be blank or contain other information. The contents of the Subject: field are ignored by listservers that recognize this form of the message 251.

Often messages sent to listservers contain a command message in both the Subject: field and the message body so that the command will be recognized by the listserver regardless of which form the listserver expects.

Listserver

A listserver is usually a programmed application that executes on a computer. The listserver processes e-mail messages sent to the distribution list's e-mail address and forwards copies of these messages to the subscribers of the distribution list (the recipients). As mentioned above, the listserver also directly receives e-mail messages sent to the listserver's e-mail address. The listserver maintains a recipient database comprising the e-mail addresses of subscribers and other information relating to the distribution lists served by the listserver. One embodiment of the invention enhances a listserver by providing the capability to process SUSPEND commands. This capability allows the listserver to suspend forwardation of messages to a recipient for a duration.

Figure 3:
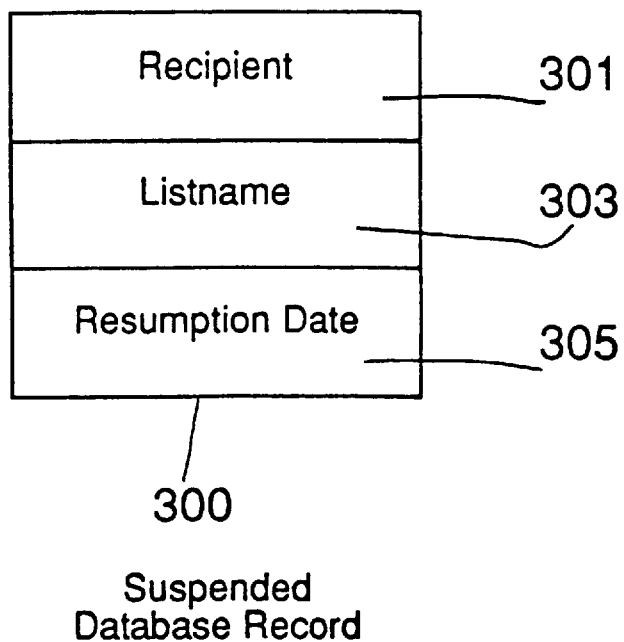
FIG. 3 illustrates the record structure of a suspended database used by a listserver in accordance with a preferred embodiment.

FIG. 3 illustrates the record structure 300 of a suspended database. The suspended database is used by the listserver to store information about subscribers who have suspended forwardation of messages sent to the distribution list. The record 300 comprises three fields. One skilled in the art will understand that the invention relates to the contents of these fields and that the actual organization of the fields in the record 300 or, for that matter, the fact that the data is maintained in a single database is not determinative of the invention. The suspended database is used to store information about listserver recipients who have suspended messages from a particular list for a duration. The listserver application may implement this storage in many ways well known in the art.

The "Recipient" field 301 contains the e-mail address of the recipient of messages forwarded from the distribution list. The "Listname" field 303 contains the name of a distribution list, subscribed to by the recipient, and distributed by the listserver. The "Resumption Date" field 305 contains the date on which the listserver is to resume forwardation of e-mail messages to the recipient. Those skilled in the art will understand that the use of a Resumption Date is just one way to specify a duration. The invention contemplates adding additional fields to the record 300 to encompass starting and ending dates along with event triggers or another resumption information. Those skilled in the art will also understand that the "recipient" 301 and "Listname" 303 fields contain, reference or provide means to access data and that this data is generally a text string.

Figure 4A:
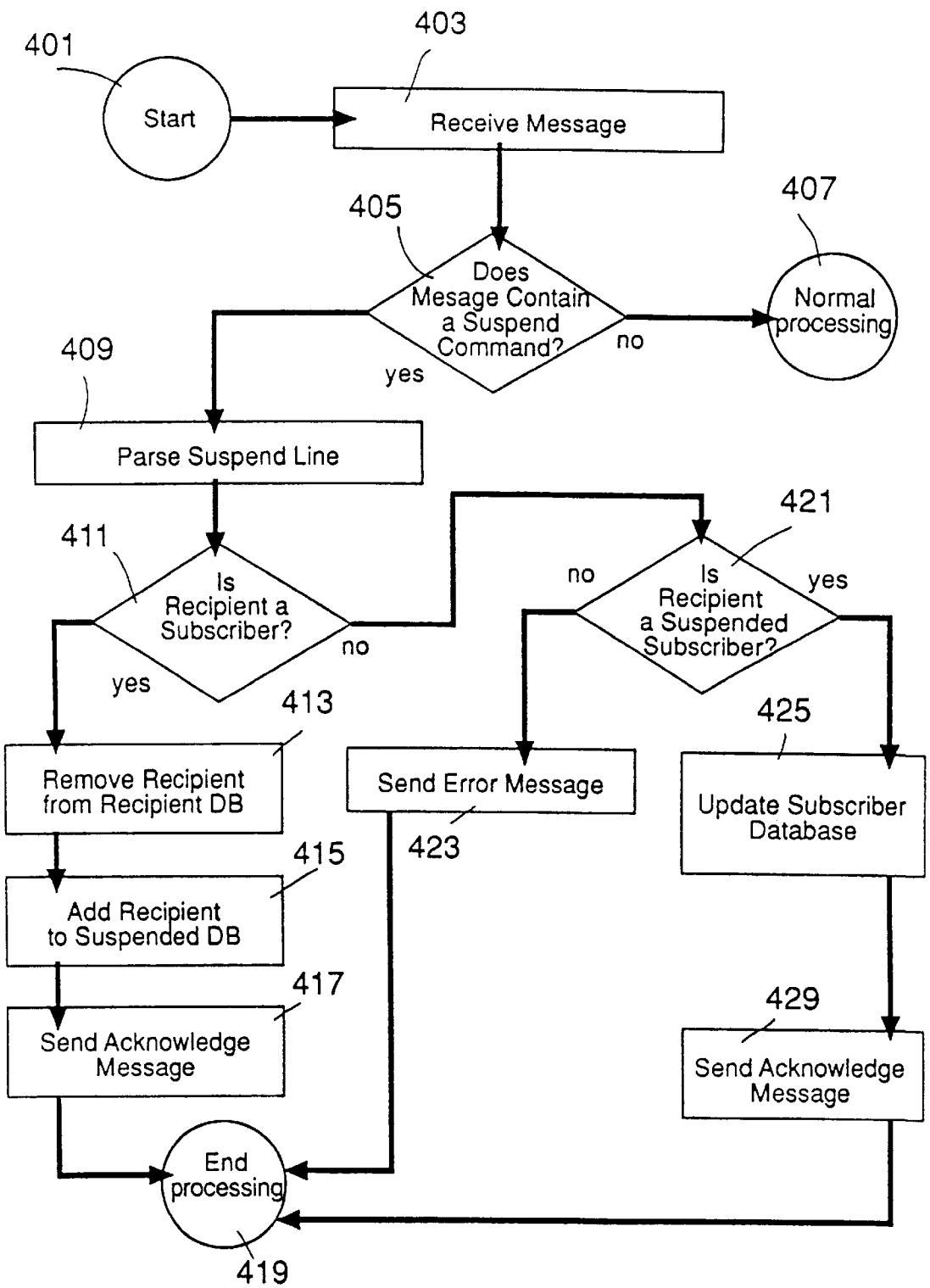
FIGS. 4A–4B illustrate the methods used by a listserver to process a suspend message in accordance with a preferred embodiment.

FIG. 4A illustrates the process used by the listserver to suspend forwardation of e-mail messages to a recipient upon the listserver's receipt of an e-mail message containing a SUSPEND command (described in FIGS. 2A or 2B). The process starts at the terminal labeled as 401. The listserver receives a message 403 and checks 405 whether the message contains a SUSPEND command (containing the data described above for one of FIGS. 2A or 2B). If the message does not contains a SUSPEND command, listserver processing continues in the prior art manner through the terminal labeled as 407. However, if 405 the message does contains a SUSPEND command (either in the body-portion or in the Subject: field-body of the message), the listserver parses the SUSPEND command 207,257 and determines 409 the subscriber-address (the e-mail address of the recipient), the listid identifying the distribution list being suspended, and the num-days being the duration of the suspension.

After determining the recipient 409, the listserver then checks 411 the recipient database to determine whether the recipient is a subscriber to the distribution list specified by the listid. If 411 the recipient is a subscriber to the specified distribution list, the recipient is removed 413 from the recipient database using prior art methods such as those used to implement the unsubscribe command. The recipient database is maintained by the listserver and comprises the e-mail addresses of the subscribers to the distribution list. Thus, with the e-mail address of the recipient removed from the recipient database, messages sent to the distribution list will no longer be forwarded to the recipient.

Next 415, the recipient is added to the suspended database. This is accomplished by creating a new record 300 in the suspended database with the subscriber-address data parsed from the SUSPEND command line stored in the "Recipient field" 301; the listid data extracted from the SUSPEND command line stored in the "Listname" field 303, and the value of the "Resumption date" field 305 is calculated by adding the num-day value to the date value in the Date: field-body in the header portion of the e-mail message. If the e-mail message does not contain a Date: field, the listserver uses the current date. Next 417, the listserver sends a confirmation message to the originator of the message (using the e-mail address contained in the From: field-body 209, 259 of the e-mail message containing the SUSPEND command) and optionally sends an informational message to the recipient if the addresses of the recipient and the originator are different. This confirmation message indicates that messages from the distribution list have been suspended, that distribution from the distribution list will automatically resume on a particular date, and includes instructions as to how to void the suspension prior to the end of the duration. Finally, the process completes through the terminal labeled as 419.

If 411 the recipient is not a subscriber to the distribution list, the process checks whether 421 the recipient for the distribution list has already been suspended. This check 421 is accomplished by examining the records in the suspended database for a record 300 that matches the data in the "Recipient" field 301 and the data in the "Listname" field 303 to the subscriber-address value and listid values respectively of the SUSPEND command. If 421 no matching record 300 is found, the process sends 423 an error message to the originator indicating that the specified recipient is not a subscriber to the list and the process completes through the terminal labeled as 419.

However, if 421 a matching record 300 is found, the suspended database record 300 matching the information in the SUSPEND command is updated 425 with the information derived from the current SUSPEND command. Next 429, the listserver sends a confirmation message to the originator of the message (as indicated by the From: field 209, 259 of the message) and optionally sends an informational message to the recipient if the addresses of the recipient and the originator are different. This confirmation message indicates forwardation has been suspended for the distribution list, that forwardation will automatically resume on a particular date, that multiple SUSPEND commands have been received, and includes instructions as to how to void the suspension prior to the end of the duration. Finally, the process completes through the terminal labeled as 419.

In the preferred embodiment described above, the duration starts when the listserver receives and processes the SUSPEND command and terminates at the resumption date.

Figure 4B:
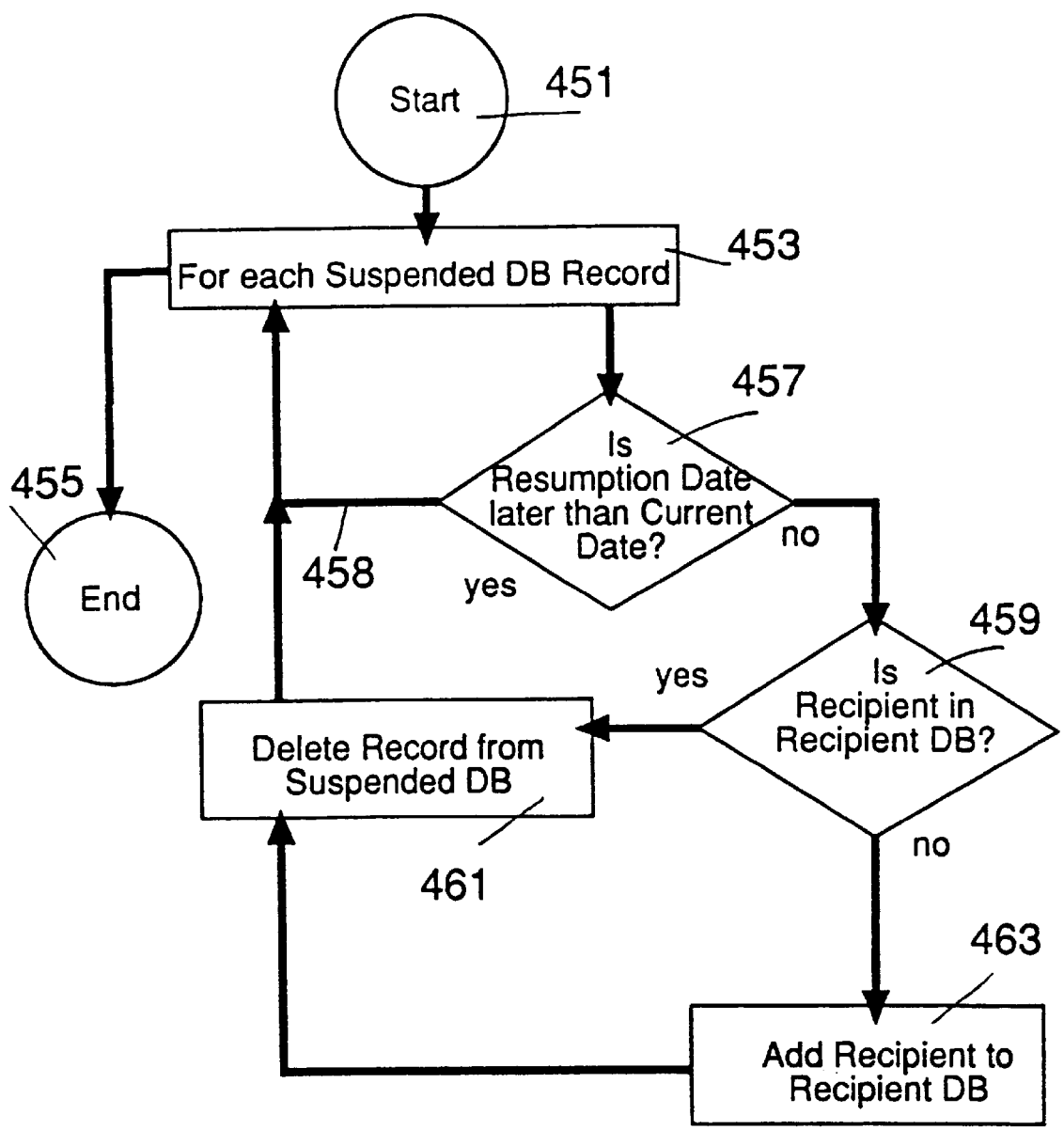

FIG. 4B illustrates the periodic process used by the listserver to resume forwardation of e-mail messages from the distribution list. In a preferred embodiment, this process is started once a day at one minute past midnight. The process starts at the terminal labeled as 451. Each record 300 in the suspended database is examined 453. If all records have been examined the process completes through the terminal labeled as 455.

Each record 300 is examined to determine whether the "Resumption date" field 305 is later than the current date. If 457 the "Resumption date" field 305 is later then the current date, nothing is done with the record 300, and the next record is examined as indicated by the arrow labeled as 458.

However, if 457 the "Resumption Date" field 305 is earlier or the same as the current date, the process checks 459 to determine whether the recipient is currently a subscriber to the distribution list (e.g., if the recipient has manually resubscribed to the distribution list instead of waiting for a prior suspension to terminate). This check 459 compares the subscriber-address and listid of the SUSPEND command for a match with the recipient database. If 459 the recipient is currently a subscriber, the matching record 300 is removed 461 from the suspended database and the next record examined.

Finally, if 459 the recipient was not in the recipient database (i.e., not currently a subscriber to the list) the recipient is added 463 to the recipient data base, the matching record 300 is deleted 461 from the suspended database, and the next record examined. Thus, forwardation of distribution list e-mail messages to the recipient resumes.

The above method, apparatus using the above inventive method, and computer programming products that cause a computer to use the above method allow an originator to send SUSPEND commands in an e-mail message to a listserver to suspend forwardation of messages from a distribution list to a recipient for a duration. One skilled in the art will understand that the invention contemplates a suspend command that can be entered directly to the listserver without being encapsulated in an e-mail message. In another preferred embodiment of the invention an application program is a utility that assists a user with managing distribution lists by causing the listserver to perform operations in response to commands.

List Management

Another aspect of the invention enables a computer user to organize and manage a database containing information about distribution lists of interest. A preferred embodiment implements a list management application that provides the user with the ability to add information about distribution lists to the database and to subscribe to those lists; remove existing distribution lists from the database and to unsubscribe from the distribution list; modify information about the database; and suspend forwardation of messages from a distribution list. The list management application can be conditioned to work with either listservers that incorporate the capability to process SUSPEND commands as described above, or listservers that do not. This application exists at the user's computer and provides a user-friendly way to manage distribution lists.

Figure 5:
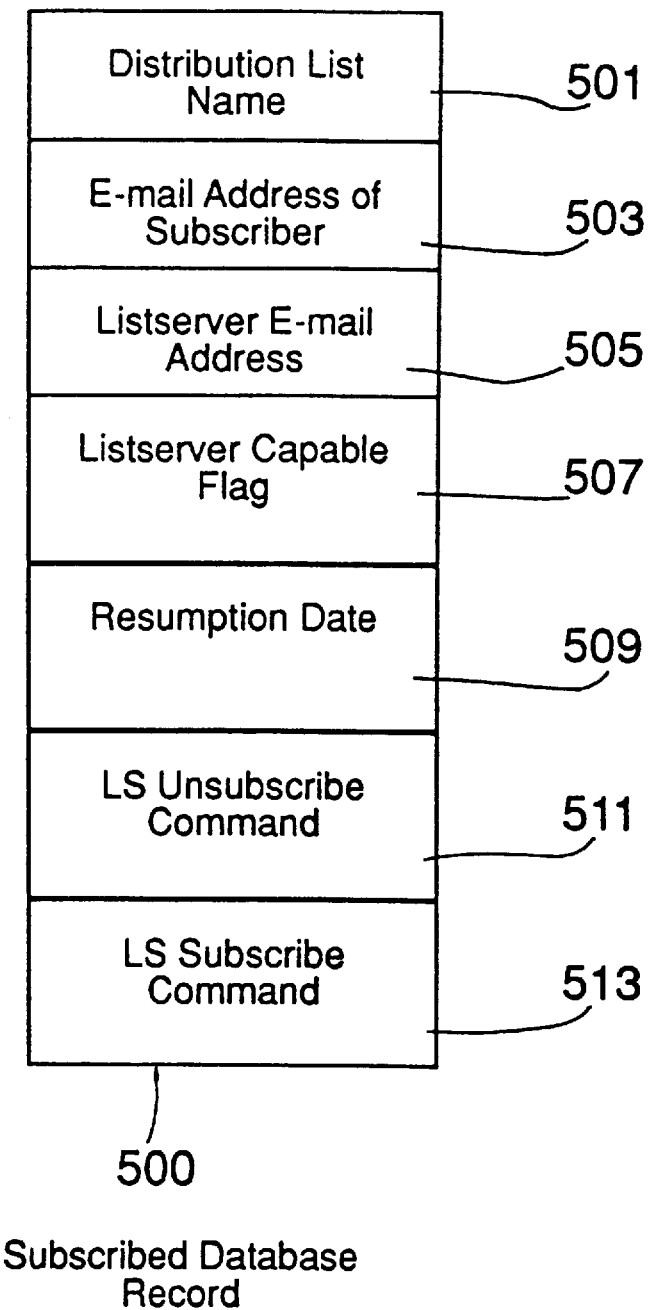
FIG. 5 illustrates the record structure of a subscribed database used by a list management application in accordance with a preferred embodiment.

FIG. 5 illustrates a database record 500 of the subscribed database maintained by the list management application. The "Distribution List Name" field 501 contains the name of a distribution list. The "E-mail Address of Subscriber" field 503 contains the e-mail address of the distribution list subscriber. The "Listserver E-mail Address" field 505 contains the e-mail address of the listserver serving the distribution list of the field labeled as 501. That is, this field 505 contains the address where subscribe, unsubscribe, suspend, and other command messages that cause the listserver to perform operations, are sent to obtain listserver services. The "Listserver Capable Flag" field 507 indicates whether the listserver associated with the e-mail address in the "Listserver E-mail Address" field 505 has the capability for handling messages containing SUSPEND commands as described above. The "Listserver Capable Flag" field 507 indicates TRUE if the listserver includes the SUSPEND capability, and FALSE if it does not. The "Resumption Date" field 509 indicates the date when a suspended distribution is to be resumed (or, like the field labeled as 305, any other resumption information). The "LS Unsubscribe Command" field 511 and the "LS Subscribe Command" field 513 are used when the listserver capable flag field 507 is FALSE indicating that the associated list server does not include the suspend capability described above. These fields 511, 513 are also used with preferred embodiments of the invention that provide automatic subscription/unsubscription upon addition/removal of a record in the subscribed database. The field labeled as 511 references or contains the text string of an unsubscribe command recognized by the listserver addressed through the field labeled as 505. The Field labeled as 513 references or contains the text string of a subscribe command recognized by the listserver addressed through the field labeled as 505.

Figure 6:
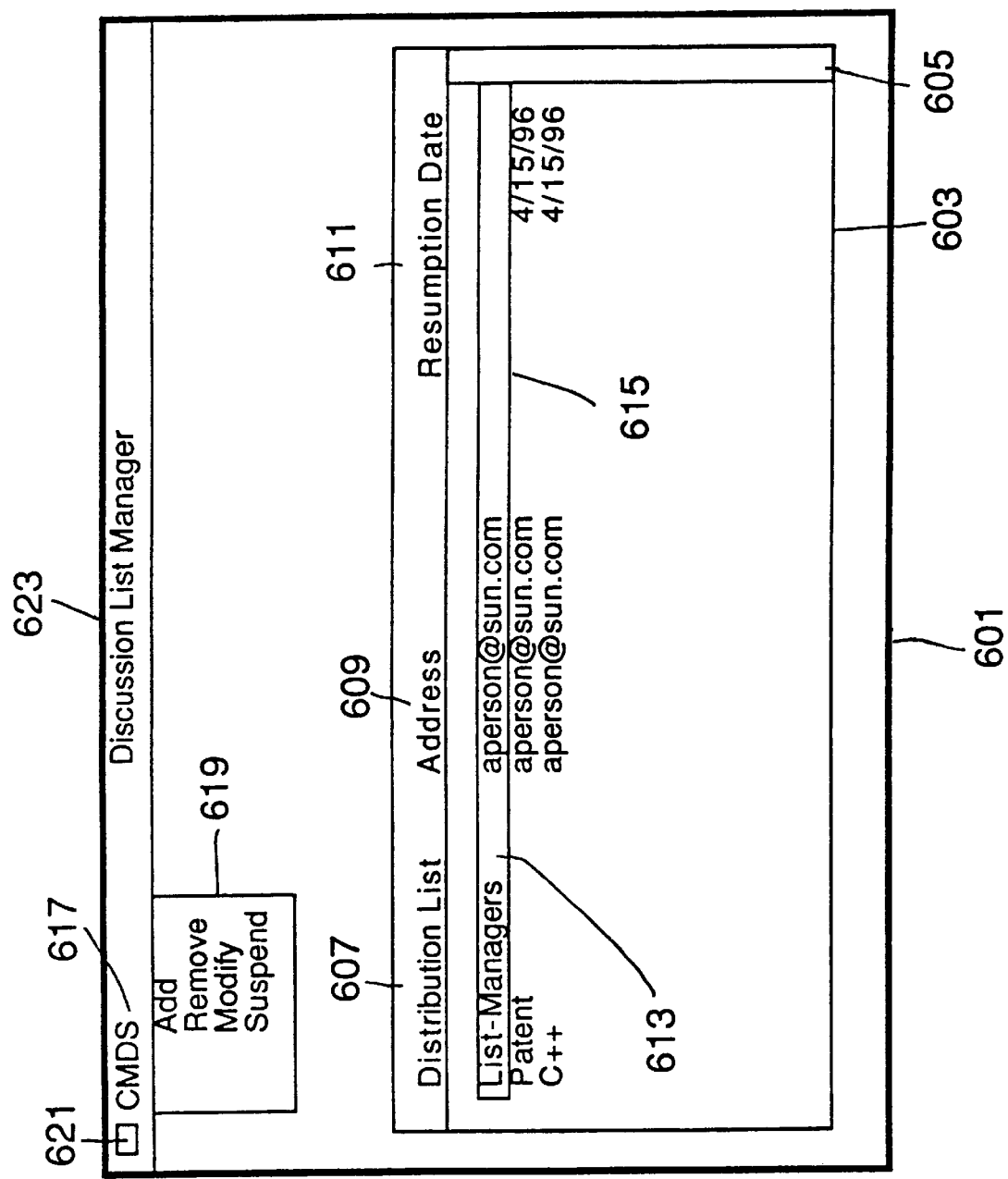
FIG. 6 illustrates a window presented to a recipient by a list management application in accordance with a preferred embodiment.

FIG. 6 illustrates a preferred embodiment of the list management application using a Graphical User Interface (GUI). Those skilled in the art will understand that a command line interface is also contemplated by the invention as are other user-computer interface methods. The list management application displays a window 601 to the user. This window 601 has a selectable control area (a close box) 621 used to terminate the application. The window 601 also includes a scrollable text area 603 used to display information contained in the subscribed database. This text area 603 is scrolled using a selectable control area 605 configured to operate as a scroll bar control. The displayed information in the scrollable text area 603 includes fixed text 607, 609, 611 that serve as headers for the displayed scrollable text. The distribution list header 607 indicates the area in the scrollable text area 603 that displays the "Distribution List Name" field 501 of the subscribed database record 500. The address header 609 indicates the area in the scrollable text area 603 that displays the "E-mail Address of Subscriber" field 503 of the subscribed database record 500. The resumption date header 611 indicates the area in the scrollable text area 603 that contains the information from the "Resumption Date" field 509 of the subscribed database record 500. If the resumption date field 509 does not contain a date, the distribution list is currently subscribed and not suspended. The record 500 data displayed in the scrollable text area 603 can be selected. In a preferred embodiment, a box 615 is drawn around the text displayed from the selected record 613 to indicate which record is selected. One skilled in the art will understand that there are many methods known to the art to indicate a selected record 613 and that the invention encompasses these methods. Along with the application termination selectable control area 621, the title bar 623 of the window 601 contains a command selectable control area 617. When selected, this selectable control area 617 generates a menu 619 of commands that may be applied to the subscribed database or selected records from the subscribed database.

Figure 7:
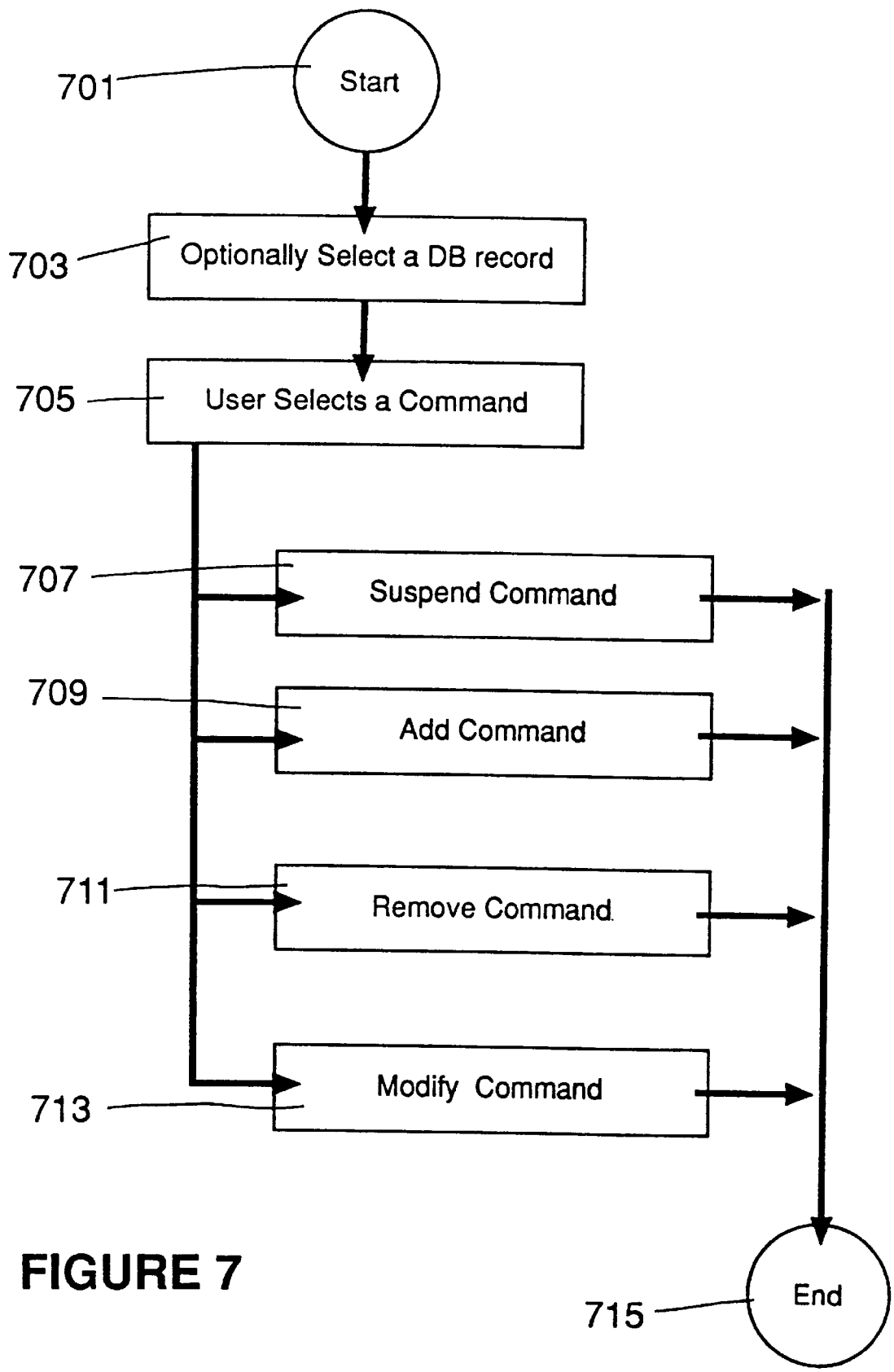
FIG. 7 illustrates the process used to select which operation a list management application is to perform in accordance with a preferred embodiment.

FIG. 7 illustrates the process used by a computer user to create or operate on records 500 in the subscribed database. The process starts at the terminal labeled as 701. The user may select a database record by activating a pointing device over the text in the scrollable text area 703. Then 705, the user selects which command to apply to the subscribed database or selected records of the subscribe database. The Modify 713 and Remove 711 commands the require the user to select a record 613 from the scrollable text area 603. The user is not required to make such a selection for the Add 709 or Suspend 707 commands. Once the user selects the command 705, the selected command is performed 707, 709, 711, 713 as described below and the process completes through the terminal labeled as 715.

Figure 8A:
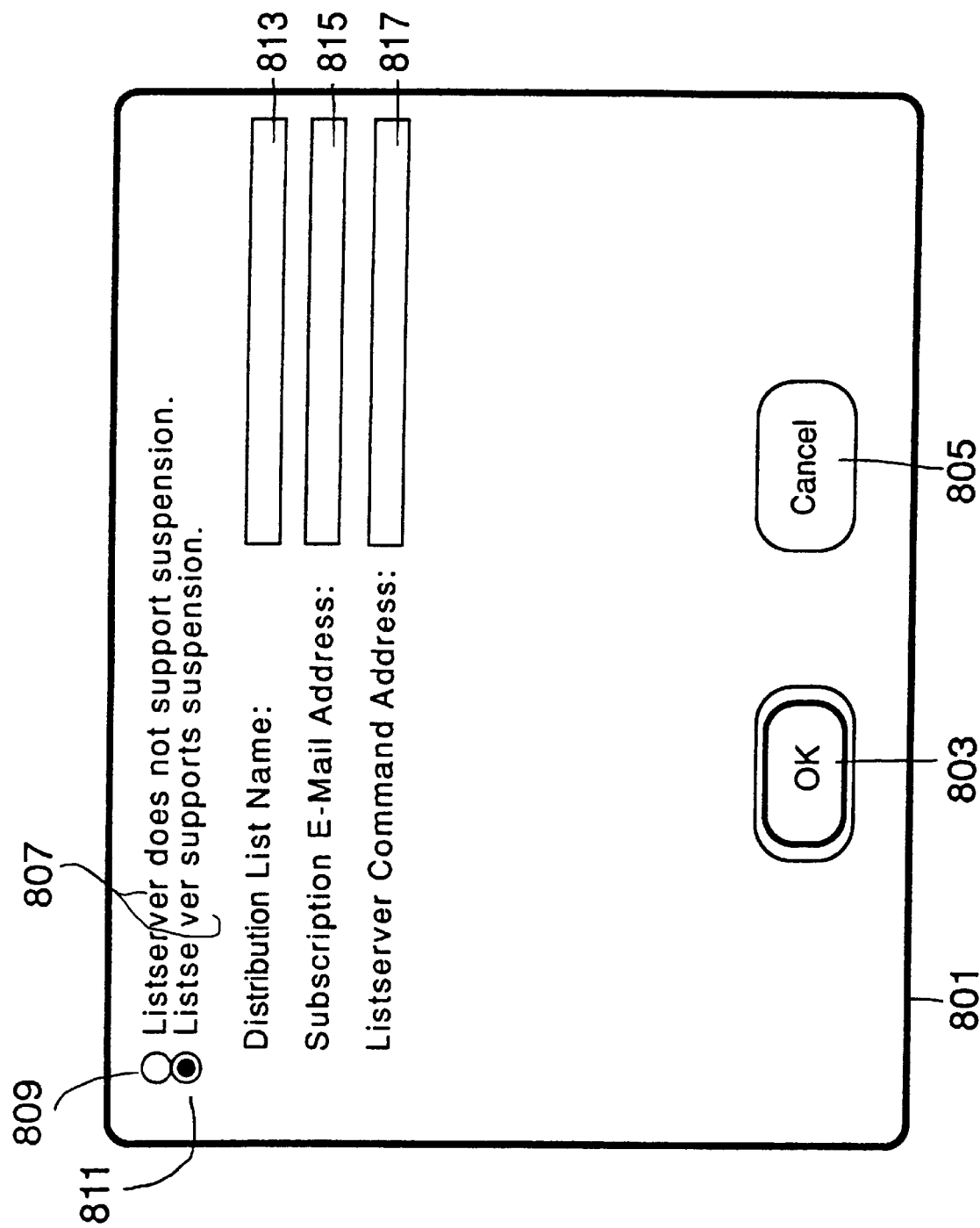
FIGS. 8A–8B illustrate the dialogs presented to the recipient when adding new listservers to the subscribed database in accordance with a preferred embodiment.
Figure 8B:
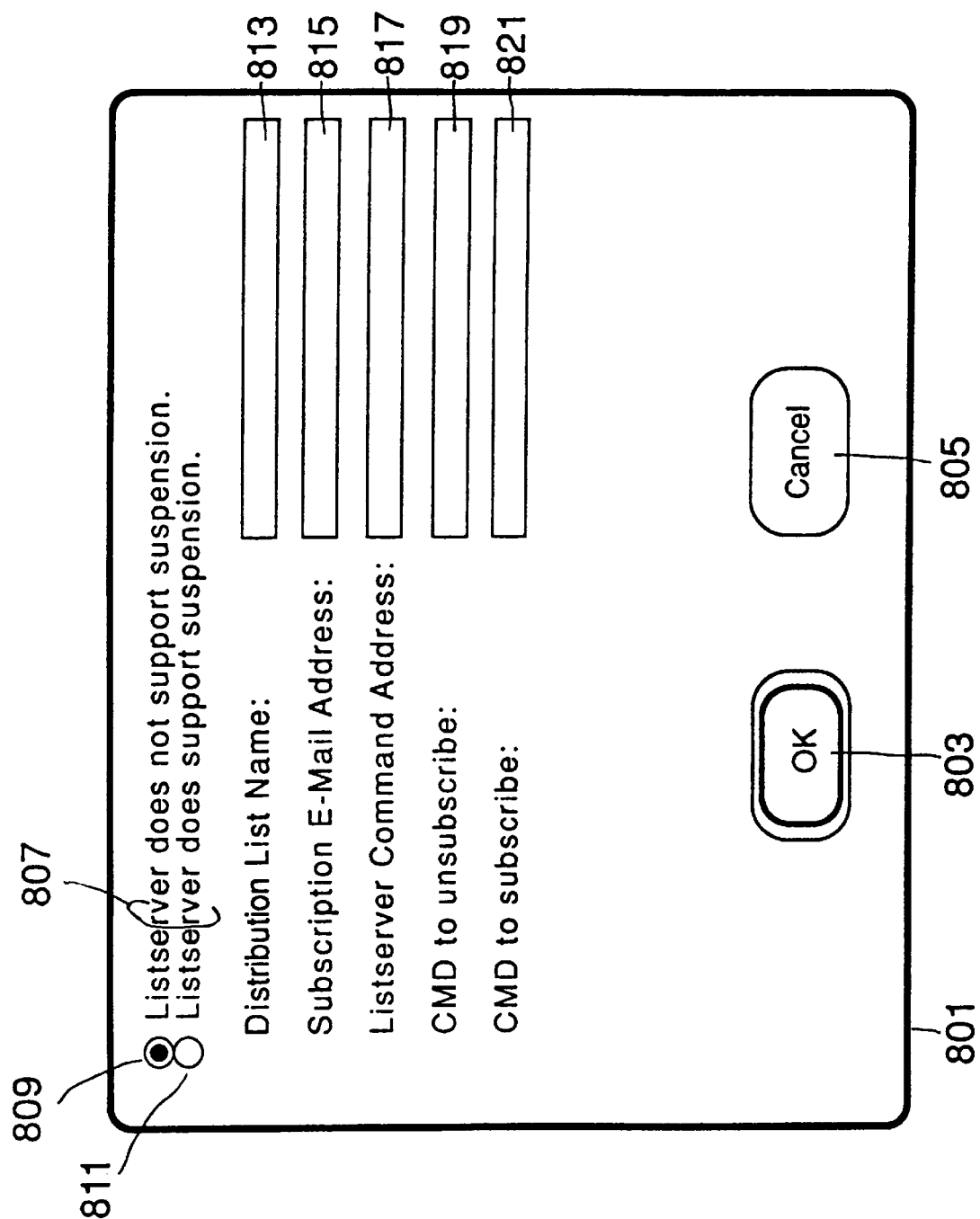

FIGS. 8A and 8B illustrate the dialog box displayed when the user selects the Add command 709. The dialog box 801 includes a radio button group 807 to indicate whether the listserver for the specified list contains the capability to process SUSPEND commands as described above. In one preferred embodiment, the list management application does not automatically subscribe to the listserver added to the database. In this embodiment, the state of the radio button group 807 conditions the amount of information requested by the dialog 801. In FIG. 8A, the intended listserver does support suspension as shown by the selected radio button labeled as 811. The other button 809 in the radio button group is not selected. Thus, the dialog 801 of FIG. 8A only need to acquire the distribution list name 813, the subscriber's e-mail address 815, and the listserver's command e-mail address 817. If the list management application does support automatic subscription when records are added to the subscribed database, the dialog of FIG. 8a is not presented regardless of the state of the radio button group 807 and the dialog displayed is that shown in FIG. 8B.

The dialog 801 also includes an "OK" selectable control area 803 and a "cancel" selectable control area 805. If the user activates the pointing device over the cancel selectable control area 805, the dialog 801 is removed from the display and the command that evoked the dialog is aborted. If the user activates the pointing device over the OK selectable control area 803, the dialog 801 is removed from the display and the command that evoked the dialog stores the information provided in the query boxes 813, 815, 817 in a record 500 in the corresponding fields. In particular, the information from the distribution list name query box 813 is used to create the data stored in the "Distribution List Name" field 501; the information from the subscription e-mail address query box 815 is used to create the data stored in the "E-mail Address of Subscriber" field 503; and the information from the listserver command address query box 817 is used to create the data stored in the "Listserver E-mail Address" field 505. Finally, the status of the radio button group 807 is stored in the "Listserver Capable Flag" field 507.

In another preferred embodiment the list management application automatically subscribes to the listserver when a new record is added to the database. In this embodiment, the dialog 801, as illustrated in FIG. 8B, allows the user to specify listserver subscribe and unsubscribe commands.

FIG. 8B illustrates the dialog 801 displayed when the radio button group 807 indicates that the listserver does not support the SUSPEND command or when the preferred embodiment of the invention supports automatic subscribe-on-addition of a distribution list to the subscribed database. The dialog 801 now acquires additional information beyond that acquired in the dialog 801 shown in FIG. 8A.

Where the selected listserver does not support the SUSPEND command as described above, the list management application implements the suspend operation by automatically unsubscribing from the distribution list and, once the duration has passed, subscribing to the distribution list once again. Thus, the user must supply the listserver commands to subscribe and unsubscribe from the distribution list. Similarly, for an embodiment that allows automatic subscribe-on-addition of a distribution list, the subscribed database must include the subscribe command recognized by the listserver. To automatically unsubscribe from the distribution list, the subscribed database must include the unsubscribe command recognized by the listserver. The "CMD to unsubscribe" query box 819 is used to input the listserver command to unsubscribe from the distribution list. The "CMD to subscribe" query box 821 is used to input the listserver command to subscribe to the list. The information input into these query boxes are stored in the "LS Unsubscribe Command" field 511 and the "LS Subscribe Command" field 513 respectively of the subscribed database record 500.

Figure 9A:
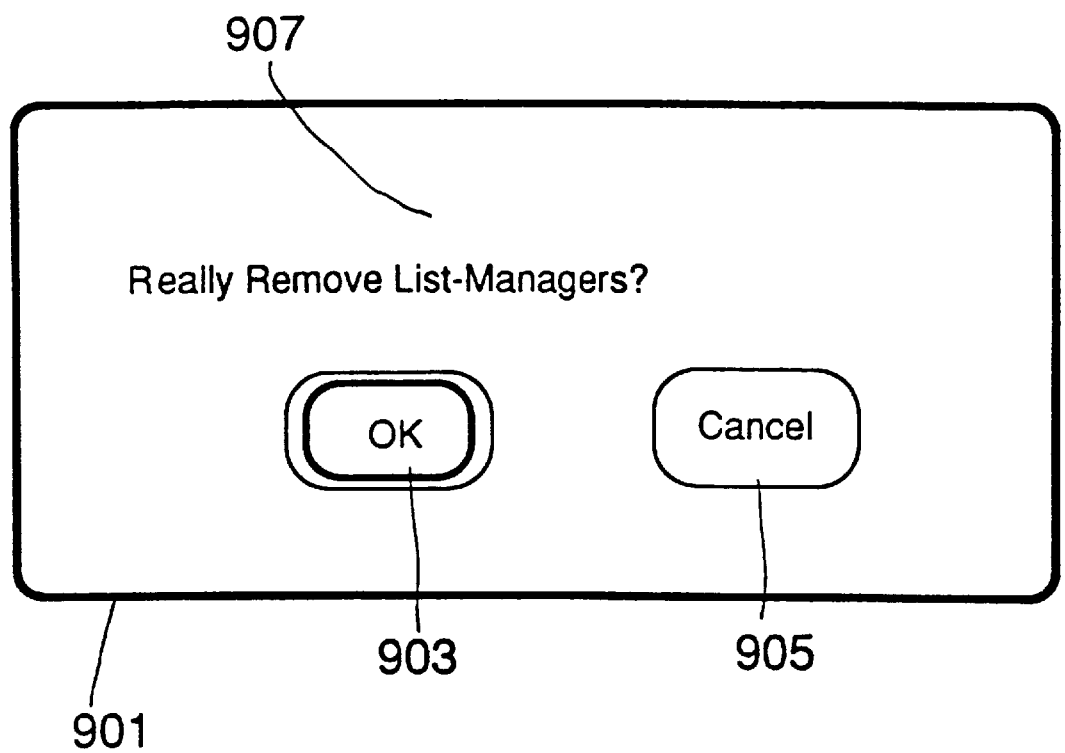
FIGS. 9A–9E illustrate the dialogs presented to a recipient when performing a command function of a list management application in accordance with a preferred embodiment.

FIG. 9A illustrates the dialog 901 evoked by the user's evocation of the remove command 711. The dialog 901 includes the standard OK 903 and cancel 905 selectable control areas that operate in the same manner as described above. This dialog 901 confirms that the user actually desires to remove the selected distribution list from control of the list manager application. In FIG. 9A, the distribution list named "List-Managers" is indicated 907 as the selected distribution list. Note that the corresponding record information 613 was selected in FIG. 6. In one preferred embodiment, removal of the distribution list from the subscribed database automatically causes the list management application to send an unsubscribe message to the affected distribution list's listserver.

Figure 9B:
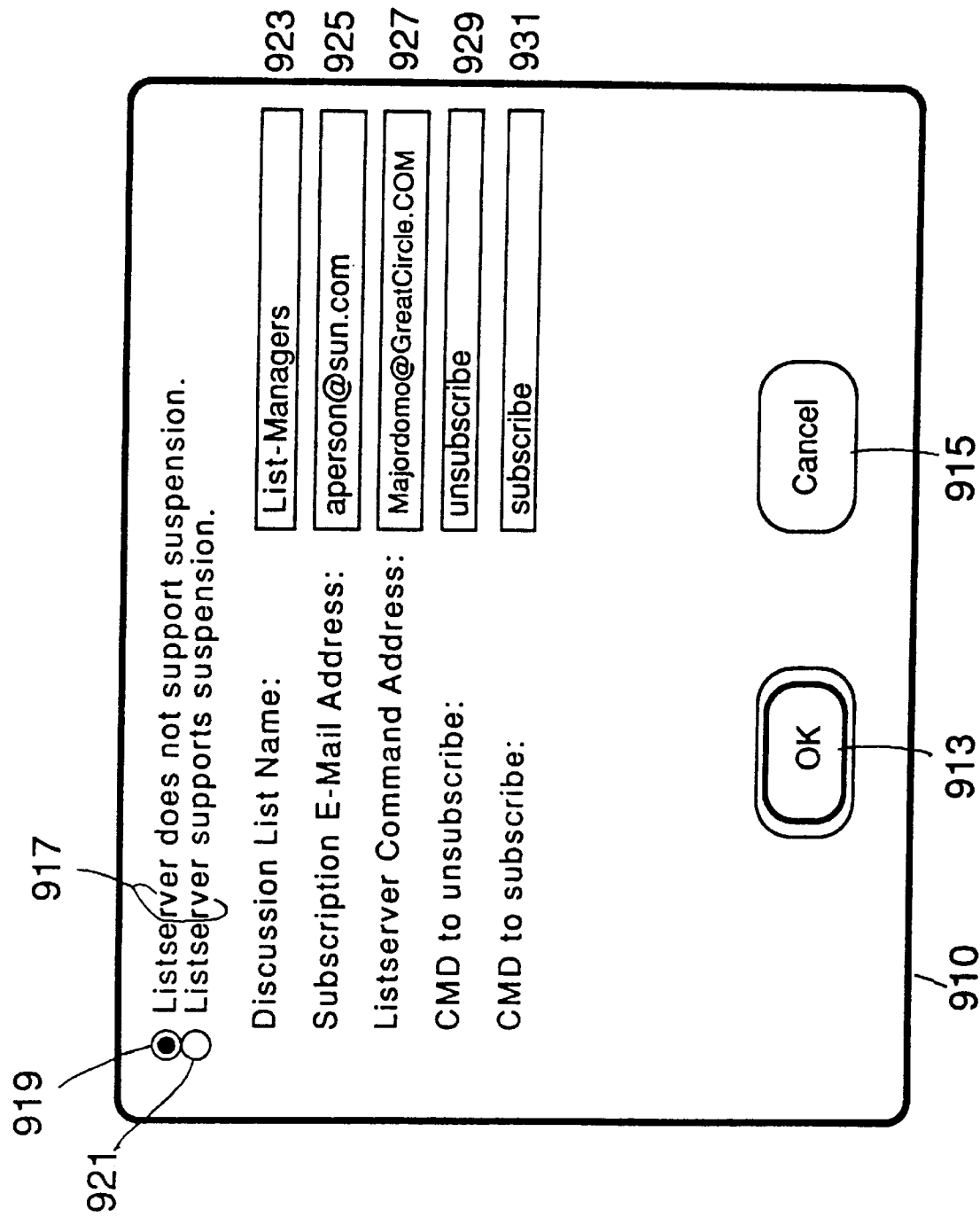

FIG. 9B illustrates the dialog evoked by the modify command 713. The dialog 910 has the same structure as shown in FIGS. 8A and 8B with the exception that the fields 923, 925, 927, 929, 931, 921, 919 are always completed with the existing data stored in the selected record 613 from the subscribed database. The user may modify these settings as desired. Like the remove command dialog, a single record is selected prior to selecting the command that evokes this dialog 910. Again, as above, activating the OK selectable control area 913, causes the dialog to be removed and any user modifications to be stored in the selected record 613. Activating the cancel selectable control area 915 causes the dialog to be removed and leaves the selected record 613 unchanged.

Figure 9C:
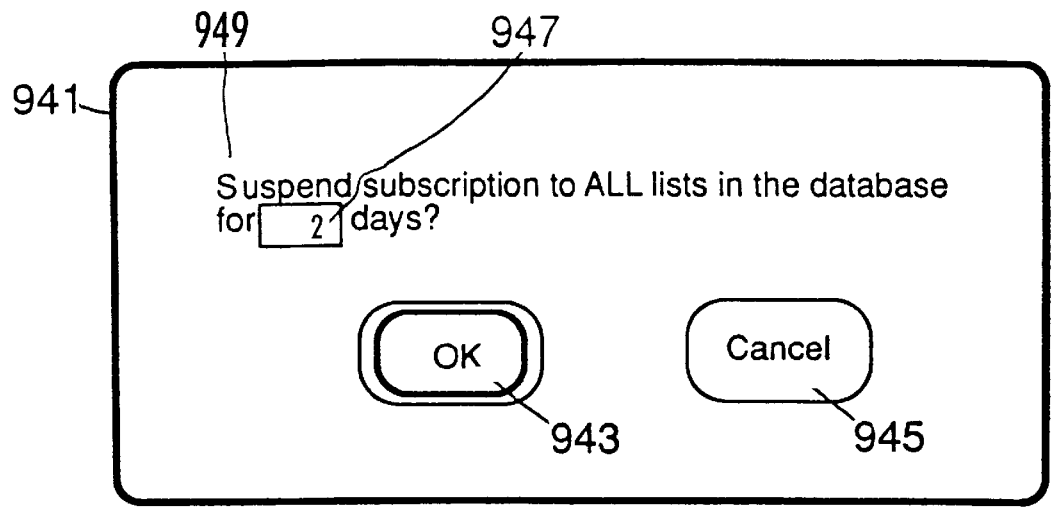

FIG. 9C illustrates the dialog 941 evoked when the user has not selected any record and requests the suspend command. The OK selectable control area 943 and the cancel selectable control area 945 operate in the standard manner already described. The dialog message 949 indicates that all lists in the database will be suspended for the user-specified number of days. The user specifies the number of days defining the duration by entering an integer in the input field 947. This parameter specification mechanism is also used in the other suspend dialogs 951, 961 that acquire resumption information.

Figure 9D:
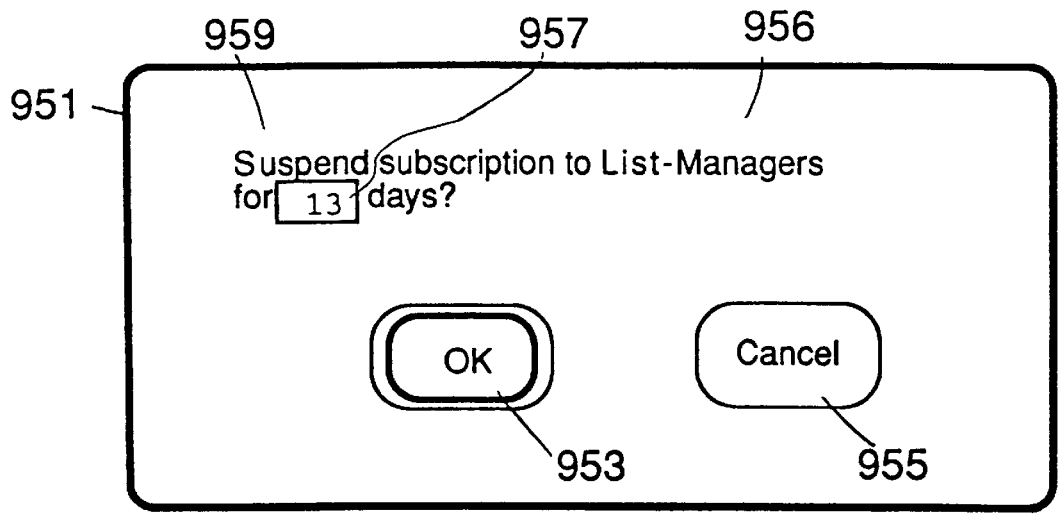

FIG. 9D illustrates the dialog 951 evoked when the user has selected one record 613 and requests the suspend command. Again, the OK selectable control area 953 and the cancel selectable control area 955 operate in the standard manner. The dialog message 959 indicates that the selected list 956 will be suspended for the user-specified number of days 957.

Figure 9E:
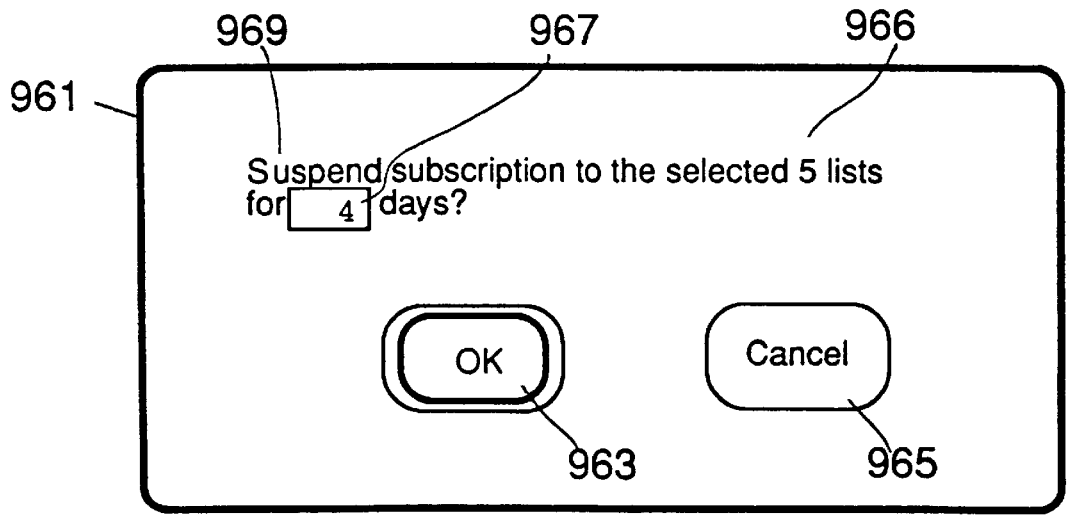

FIG. 9E illustrates the dialog 961 evoked when the user has selected multiple records and requests the suspend command. Again, the OK selectable control area 963 and the cancel selectable control area 965 operate in the standard manner. The dialog message 969 indicates that the number of selected lists 966 will be suspended for the user-specified number of days 967.

Figure 10:
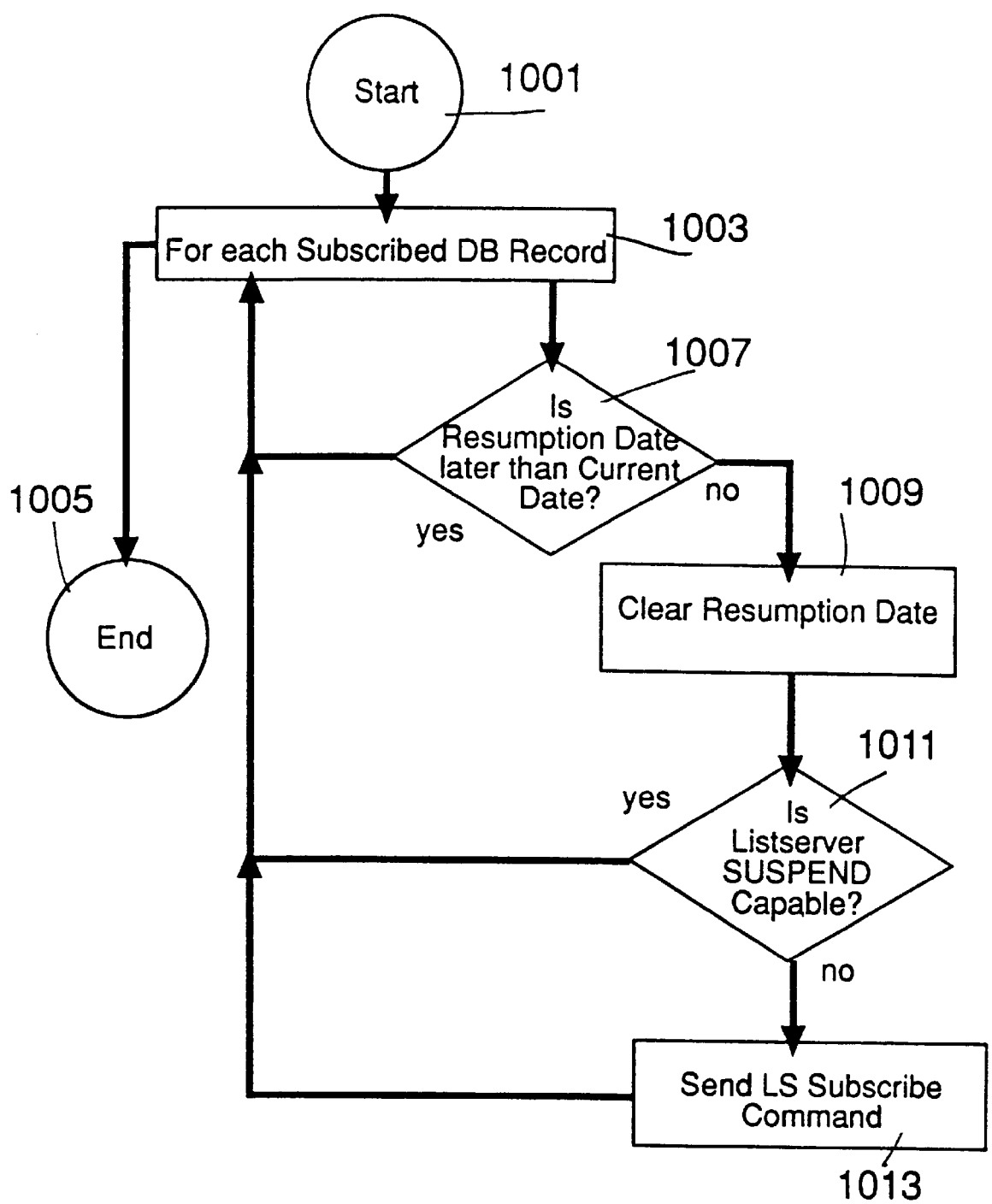
FIG. 10 illustrates the process used by a list management application to resume a suspended list server in accordance with a preferred embodiment.

FIG. 10 illustrates the process used by the list management application to resume delivery of messages from a suspended listserver. In a preferred embodiment this process executes once per day shortly after midnight when the load on the user's computer is low. The process starts at the terminal labeled as 1001. Each record 500 in the subscribed database is examined 1003. When all records in the subscribed database are examined, the process completes through the terminal labeled as 1005. If 1007 the Resumption Date 509 is later than the current date nothing is done with the instant record 500 and processing continues 1003 with the next record. If 1007 the resumption date is earlier than or equal to the current date, the forwardation of messages from the suspended distribution list must be resumed. First 1009, the Resumption Date 509 in the record 500 is cleared. Then, if 1011 the listserver is capable (as shown by the state of the Listserver Capable Flag 507) the process advances to the next record because the listserver itself will re-enable forwardation of the list. However, if 1011 the listserver is not capable, the list management application sends 1013 a subscribe command message to the listserver. The subscribe command string is stored in the record 500 in the field labeled as 513.

Figure 11A:
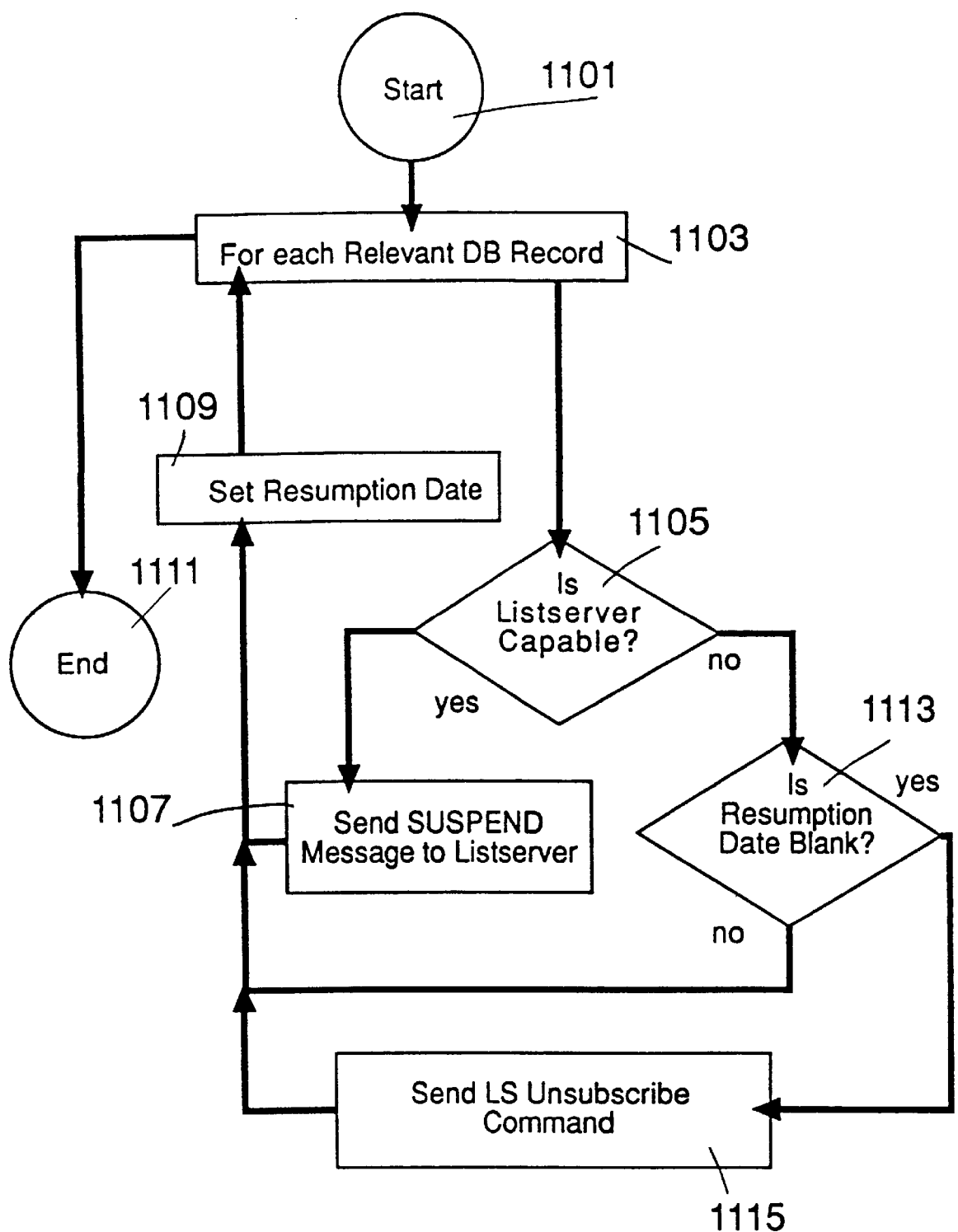
FIGS. 11A–11D illustrates the process used by a list management application to send command messages to a listserver in accordance with a preferred embodiment.

FIG. 11A illustrates the process that occurs when the user selects the OK selectable control area 943, 953, 963 after evoking a suspend dialog 941, 951, 961. The process starts at the terminal labeled as 1101 and processes each relevant record 1103. A relevant record is one that has been selected by the modify dialog processes described above. When all relevant records have been processed, the process completes through the terminal labeled as 1111. The record's "Listserver Capable Flag" field 507 is tested 1105. This field 507 indicates whether the listserver addressed by the data in the "Listserver E-mail Address" field 505 has incorporated the invention and recognizes SUSPEND commands in e-mail messages addressed to the listserver. If the listserver is capable, a message containing a SUSPEND command is constructed and sent 1107 to the listserver with the address from the field labeled as 505. The process then sets 1109 the resumption date contained in the "Resumption Date" field 509 of the record 500 as a function of the current date and the user specified number of days to suspend. Finally, the loop continues for the next relevant record 1103. If 1105 the listserver is not capable of handling SUSPEND commands, the "Resumption Date" field 509 in the record 500 is checked. If 1113 the "Resumption Date" field 509 is not blank (meaning that the list is currently suspended), the new resumption date, as specified by the current date and the user's specified number of days for suspension, is stored 1109 in the "Resumption Date" field 509. If 1113 the "Resumption Date" field 509 is blank the listserver unsubscribe command stored in the "LS Unsubscribe Command" field 511 of the record 500 is sent 1115 to the listserver using the address from the field labeled as 505. Finally 1109, the resumption date field 509 is set as described above. Note that because of the operation of a SUSPEND capable listserver, the list management application need not make a resumption date check as in the conditional labeled as 1113 for capable listserver applications.

Figure 11B:
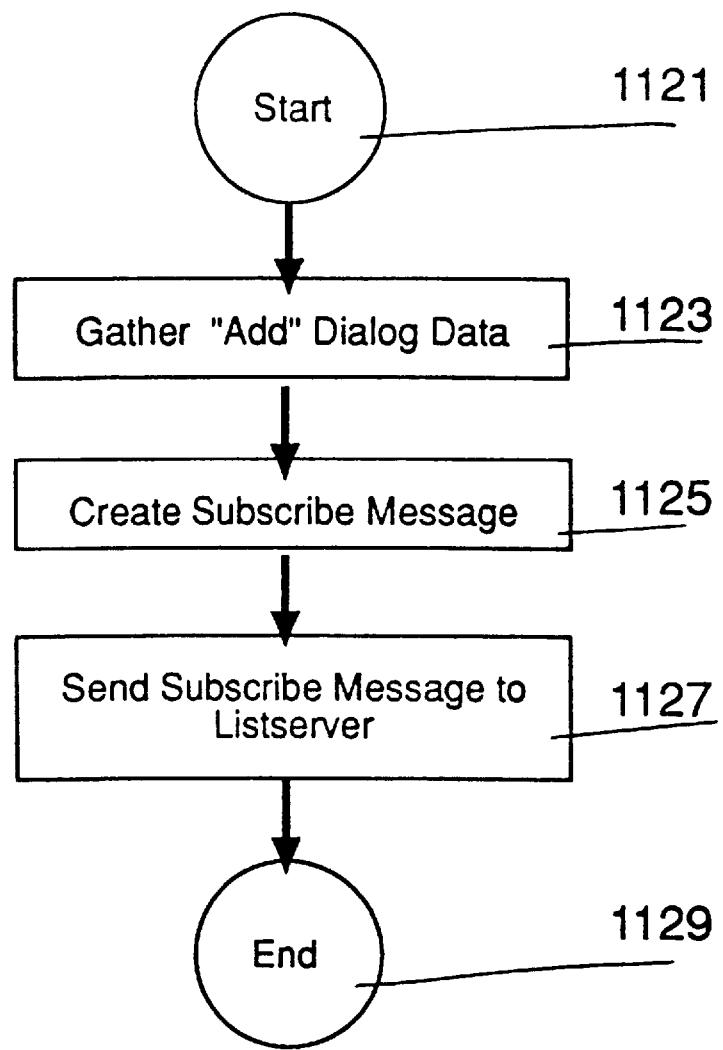

FIG. 11B illustrates the process used by the list management application in a preferred embodiment that automatically subscribes to distribution lists added to the subscribed database by the "add" command. The process starts at the terminal labeled as 1121. The list management application displays a dialog and gathers dialog data 1123 as shown in FIG. 8B. The subscribe message mechanism of the list management application then creates 1125 and sends 1127 a subscribe message directed to the listserver. Finally, the process completes through the terminal labeled as 1129.

Figure 11C:
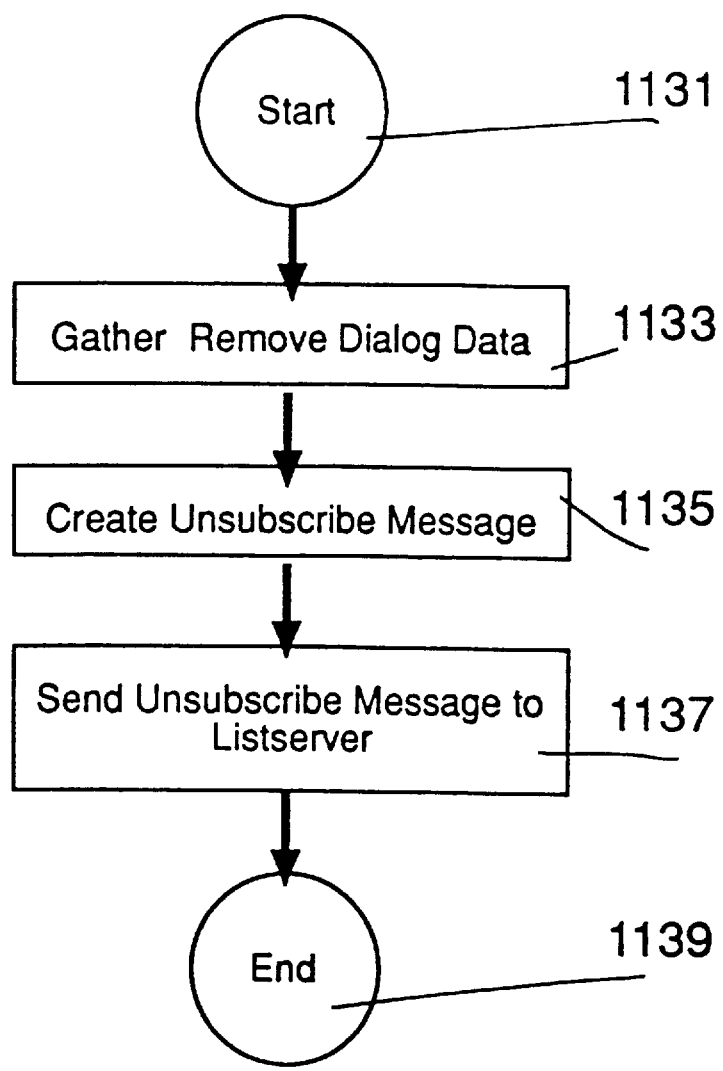

FIG. 11C illustrates the process used by the list management application in a preferred embodiment that automatically unsubscribes to distribution lists removed from the subscribed database by the "remove" command. The process starts at the terminal labeled as 1131. The list management application displays a dialog box and gathers dialog data 1133 as shown in FIG. 9A. The unsubscribe message mechanism of the list management application then creates 1135 and sends 1137 a unsubscribe message directed to the listserver. Finally, the process completes through the terminal labeled as 1139.

Figure 11D:
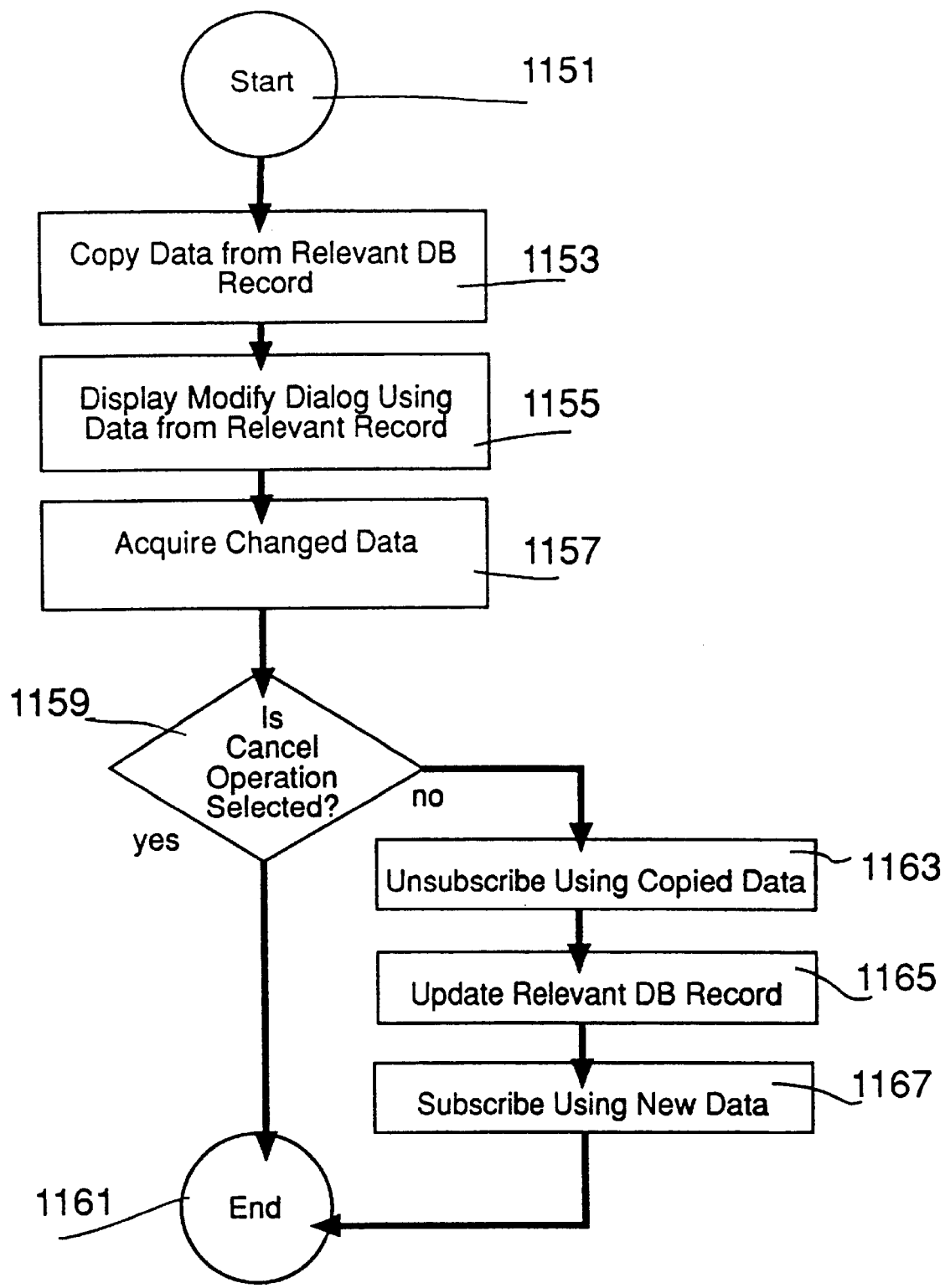

FIG. 11D illustrates the process used by the list management application in a preferred embodiment that automatically subscribes and unsubscribes to and from distribution lists in response to modify commands. The process starts at the terminal labeled as 1151. The list management application copies data 1153 from the relevant (selected) subscribed database record 613 and displays 1155 a dialog box and gathers dialog data 1157 as shown in FIG. 9B. If 1159 the user selects the cancel selectable control area 915 the process completes through the terminal labeled as 1161 without any change to the subscribed database or any messages being sent to the listserver. However, if 1159 the OK selectable control area was selected to cause the user modifications to be applied, the list management application creates an unsubscribe command and an e-mail message directed to the listserver from the copied data—and sends this message 1163. Next 1165, the relevant subscribed database record 500 is updated with the new user supplied information. Finally, the list management application constructs a subscribe command and an e-mail message based on the new user-supplied information and sends 1167 this message. The process terminates through the terminal labeled as 1161.

Conclusion

One skilled in the art will understand that the invention as described above teaches a list management application that provides additional functionality to the distribution list user by improving the users ability to manage e-mail forwarded by the distribution list to the user. Further one skilled in the art will understand that the invention described above also teaches an improvement to prior art listserver applications. This improvement provides the listserver application with the ability to process SUSPEND commands.

Further, one skilled in the art will understand that various modifications and alterations may be made in the preferred embodiment disclosed herein without departing from the scope of the invention. Accordingly, the scope of the invention is not to be limited to the particular invention embodiments discussed above, but should be defined only by the claims set forth below and equivalents thereof.

What is claimed is:

1. A computer controlled method for distributing, by a listserver to a recipient, electronic mail (e-mail) list messages sent to a distribution list; said computer controlled method comprising steps of:
   (a) selecting said distribution list serviced by said listserver;
   (b) specifying a duration for which distribution of said e-mail list messages is to be suspended; and
   (c) causing said listserver to suspend distribution of said e-mail list messages to said recipient for said duration whereby said e-mail list messages sent to said distribution list during said duration are not distributed to said recipient.

2. The computer controlled method of claim 1 further comprising:
   (d) automatically resuming distribution of said e-mail list messages by said listserver to said recipient after said duration.

3. The computer controlled method of claim 2 whereby step (c) comprises steps of:
   (c1) recognizing a suspend command message;
   (c2) stopping distribution of said e-mail list messages by said listserver to said recipient; and
   (c3) storing resumption information.

4. The computer controlled method of claim 3 whereby step (d) comprises steps of:
   (d1) detecting when said duration has completed dependent on said resumption information; and
   (d2) starting distribution of said e-mail list messages by said listserver to said recipient.

5. The computer controlled method of claim 1 whereby step (c) further comprises steps of:
   (c1) sending an unsubscribe command message to said listserver; and
   (c2) storing resumption information.

6. The computer controlled method of claim 5 further comprising steps of:
   (d) detecting when said duration has completed based on said resumption information; and
   (e) sending a subscribe command message to said listserver.

7. The computer controlled method of claim 1 whereby step (c) further comprises sending a suspend command message to said listserver.

8. The computer controlled method of claim 7 whereby said suspend command message comprises:
   a list name string that identifies said distribution list to said listserver;
   a subscriber address string that identifies said recipient; and
   a time string that specifies said duration.

9. A listserver apparatus configured to distribute, to a recipient, electronic mail (e-mail) list messages sent to a distribution list; said apparatus having a central processing unit (CPU), a memory, and a filestorage mechanism; said apparatus comprising:

a suspend mechanism configured to stop distribution of said list messages to said recipient; said suspend mechanism responsive to a suspend command message;

a storage mechanism configured to store resumption information derived from said suspend command message; said resumption information comprising a duration for which distribution of said e-mail list messages is to be suspended; and a resumption mechanism configured to automatically resume distribution of said list messages to said recipient after said duration.

10. The listserver apparatus of claim 9 whereby said suspend command message comprises:
   a list name string that identifies said distribution list to said listserver apparatus;
   a subscriber address string that identifies said recipient; and
   a time string that specifies said duration.

11. A list management apparatus configured to manage a distribution list controlled by a listserver by sending electronic mail (e-mail) command messages to said listserver; said apparatus having a central processing unit (CPU), a memory, and a filestorage mechanism; said listserver distributing e-mail list messages to a recipient; said apparatus comprising:

a database mechanism configured to store, using said filestorage mechanism, list information relating to said distribution list and said listserver; said list information comprising resumption information; and a list suspension mechanism configured to cause said listserver to suspend distribution of said list messages for a duration.

12. The list management apparatus of claim 11 whereby said list suspension mechanism comprises:
   a parameter specification mechanism configured to obtain resumption information; and
   a suspend message mechanism configured to send a suspend command message to said listserver; said suspend command message constructed using said resumption information.

13. The listserver apparatus of claim 12 whereby said suspend command message comprises:
   a list name string that identifies said distribution list to said listserver;
   a subscriber address string that identifies said recipient; and
   a time string that specifies said duration.

14. The list management apparatus of claim 11 whereby said list suspension mechanism further comprises:
   a parameter specification mechanism configured to obtain resumption information;
   an unsubscribe message mechanism configured to send an unsubscribe command message to said listserver; said unsubscribe command message constructed using said resumption information;
   a duration completion detection mechanism configured to detect a completion of said duration based on said resumption information; and
   a subscribe message mechanism configured to send a subscribe command message to said listserver after said completion; said subscribe command message constructed using said resumption information.

15. A list management apparatus configured to manage a distribution list controlled by a listserver by sending electronic mail (e-mail) command messages to said listserver; said apparatus responsive to user commands and having a central processing unit (CPU), a memory, and a filestorage mechanism; said listserver distributing e-mail list messages; said apparatus comprising: a list subscription mechanism configured to cause said listserver to add a recipient to said distribution list; said subscription mechanism sending a subscribe command message to said listserver; said subscription mechanism responsive to an add command; and a database mechanism, responsive to said add command, configured to store list information relating to said distribution list and said listserver.

16. The list management apparatus of claim 15 further comprising a list unsubscription mechanism configured to cause said listserver to remove said recipient from said distribution list; said unsubscription mechanism sending an unsubscribe command message to said listserver; said unsubscription mechanism responsive to a remove command.

17. A computer program product comprising:
(a) a computer usable storage medium having computer readable code embodied therein for causing a computer to distribute, to a recipient, of electronic mail (e-mail) list messages sent to a distribution list; said computer program product comprising:
(b) computer readable code devices configured to cause said computer to effect a suspend mechanism configured to stop distribution of said list messages to said recipient; said suspend mechanism responsive to a suspend command message;
computer readable code devices configured to cause said computer to effect a storage mechanism configured to store resumption information derived from said suspend command message; said resumption information comprising a duration for which distribution of said e-mail list messages is to be suspended; and
computer readable code devices configured to cause said computer to effect a resumption mechanism configured to automatically resume distribution of said list messages to said recipient after said duration.

18. The computer program product of claim 17 whereby said suspend command message comprises:
a list name string that identifies said distribution list to said listserver;
a subscriber address string that identifies said recipient; and
a time string that specifies said duration.

19. A computer program product comprising:
(a) a computer usable storage medium having computer readable code embodied therein for causing a computer to manage a distribution list controlled by a listserver; said listserver distributing e-mail list messages to a recipient; said computer program product comprising:
(b) computer readable code devices configured to cause said computer to effect a database mechanism configured to store, using said filestorage mechanism, list information relating to said distribution list and said listserver; and
computer readable code devices configured to cause said computer to effect a list suspension mechanism configured to cause said listserver to suspend distribution of said list messages for a duration; said list suspension mechanism configured to send electronic mail (e-mail) command messages to said listserver.

20. The computer program product of claim 19 whereby said list suspension mechanism comprises:

computer readable code devices configured to cause said computer to effect a parameter specification mechanism configured to obtain resumption information; and
computer readable code devices configured to cause said computer to effect a suspend message mechanism configured to send a suspend command message to said listserver; said suspend command message constructed using said resumption information.

21. The computer program product of claim 20 whereby said suspend command message comprises:
a list name string that identifies said distribution list to said listserver;
a subscriber address string that identifies said recipient; and
a time string that specifies said duration.

22. The computer program product of claim 19 whereby said list suspension mechanism comprises:
computer readable code devices configured to cause said computer to effect a parameter specification mechanism configured to obtain resumption information;
computer readable code devices configured to cause said computer to effect an unsubscribe message mechanism configured to send an unsubscribe command message to said listserver;
computer readable code devices configured to cause said computer to effect a duration completion detection mechanism configured to detect a completion of said duration based on said resumption information; and
computer readable code devices configured to cause said computer to effect a subscribe message mechanism configured to send a subscribe command message to said listserver after detection of said completion; said subscribe command message constructed using said resumption information.

23. A computer program product comprising:
(a) a computer usable storage medium having computer readable code embodied therein for causing a computer to manage a distribution list controlled by a listserver by sending electronic mail (e-mail) command messages to said listserver; said computer program product comprising:
(b) computer readable code devices configured to cause said computer to effect a user command recognition mechanism configured to recognize user commands;
computer readable code devices configured to cause said computer to effect a list subscription mechanism configured to cause said listserver to add a recipient to said distribution list; said subscription mechanism sending a subscribe command message to said listserver; said subscription mechanism responsive to an add command; and
computer readable code devices configured to cause said computer to effect a database mechanism, responsive to said add command, configured to store list information relating to said distribution list and said listserver.

24. The computer program product of claim 23 further comprising computer readable code devices configured to cause said computer to effect a list unsubscription mechanism configured to cause said listserver to remove a recipient from said distribution list; said unsubscription mechanism sending an unsubscribe command message to said listserver; said unsubscription mechanism responsive to a remove command.

25. A list management system having a listserver application, and a distribution list management application; said list management system comprising:

a list management database configured to store distribution list information;

a database manipulation mechanism configured to manipulate said list management database; and a listserver command mechanism responsive to said database manipulation mechanism; said database manipulation mechanism configured to send a electronic mail (e-mail) command message to said listserver application; said e-mail command message causing said listserver application to affect an operation.

26. The list management system of claim 25 wherein said operation is a subscribe operation.

27. The list management system of claim 25 wherein said operation is a unsubscribe operation.

28. The list management system of claim 25 wherein said operation is a suspend operation.

29. The list management system of claim 25 wherein said listserver application and said list management applications execute on a central processing unit (CPU); said CPU coupled to a memory and a filestorage.

30. The list management system of claim 25 wherein said listserver application executes on a first central processing unit and said list management application executes on a second central processing unit; said first central processing unit coupled to a first memory and a filestorage; said second central processing unit coupled to a second memory.

* * * * *